United States Patent
Borke

(10) Patent No.: US 9,089,246 B2
(45) Date of Patent: Jul. 28, 2015

(54) DISPENSER HAVING MORE THAN ONE OUTPUT DRIVE CONDITION

(71) Applicant: Georgia-Pacific Consumer Products LP, Atlanta, GA (US)

(72) Inventor: Brian S. Borke, Appleton, WI (US)

(73) Assignee: GEORGIA-PACIFIC CONSUMER PRODUCTS LP, Atlanta, GA (US)

( * ) Notice: Subject to any disclaimer, the term of this patent is extended or adjusted under 35 U.S.C. 154(b) by 0 days.

(21) Appl. No.: 14/100,045

(22) Filed: Dec. 9, 2013

(65) Prior Publication Data

US 2014/0158809 A1  Jun. 12, 2014

Related U.S. Application Data

(60) Provisional application No. 61/735,594, filed on Dec. 11, 2012.

(51) Int. Cl.
| | |
|---|---|
| *B65H 26/00* | (2006.01) |
| *A47K 10/36* | (2006.01) |
| *H02P 7/14* | (2006.01) |
| *A47K 10/34* | (2006.01) |
| *H02P 7/00* | (2006.01) |

(52) U.S. Cl.
CPC .............. *A47K 10/3687* (2013.01); *H02P 7/14* (2013.01); *A47K 10/34* (2013.01); *H02P 2007/0033* (2013.01)

(58) Field of Classification Search
CPC ...................................................... A47K 10/34
USPC ......................................................... 700/240
See application file for complete search history.

(56) References Cited

U.S. PATENT DOCUMENTS

| | | | | |
|---|---|---|---|---|
| 6,069,354 | A * | 5/2000 | Alfano et al. | 250/221 |
| 6,736,348 | B1 | 5/2004 | Formon et al. | |
| 6,903,654 | B2 * | 6/2005 | Hansen et al. | 340/562 |

(Continued)

FOREIGN PATENT DOCUMENTS

WO   2011059423 A1   5/2011

OTHER PUBLICATIONS

Written Opinion for International Application No. PCT/US2013/073784; International Filing Date Dec. 9, 2013; Date of Mailing: Mar. 4, 2014; 6 pages.

(Continued)

*Primary Examiner* — Michael K Collins
(74) *Attorney, Agent, or Firm* — Cantor Colburn LLP

(57) ABSTRACT

A product dispenser includes a product housing including a drive system and a dispensing apparatus. The drive system includes a motive power device and a controller and is configured to receive energy from an energy supply. The dispensing apparatus is configured to dispense the product. During a condition when the product is being dispensed, the dispensing apparatus is subject to a dispensing resistance and the drive system provides an output to the dispensing apparatus to overcome the dispensing resistance, the output being characterized by a dispensing parameter. The controller receives the dispensing parameter and responsively operates the motive power device, such that the controller operates the motive power device in a first output drive condition in response to the dispensing parameter being below a threshold value, and operates the motive power device in a second output drive condition in response to the dispensing parameter being above a threshold value.

26 Claims, 14 Drawing Sheets

(56) References Cited

U.S. PATENT DOCUMENTS

| | | | |
|---|---|---|---|
| 7,014,140 B2* | 3/2006 | Elliott et al. | 242/559.2 |
| 7,040,566 B1* | 5/2006 | Rodrian et al. | 242/563 |
| 7,084,592 B2 | 8/2006 | Rodrian | |
| 7,114,676 B2* | 10/2006 | Elliott et al. | 242/559.2 |
| 7,213,782 B2 | 5/2007 | Osborne et al. | |
| 7,370,824 B1* | 5/2008 | Osborne | 242/563 |
| 7,594,622 B2* | 9/2009 | Witt et al. | 242/563.2 |
| 7,874,509 B2* | 1/2011 | Kenney | 242/563.2 |
| 7,984,872 B2* | 7/2011 | Kuehneman et al. | 242/563.2 |
| 8,297,160 B2 | 10/2012 | Friesen et al. | |
| 8,616,489 B2* | 12/2013 | Goeking et al. | 242/564.4 |
| 2002/0109035 A1 | 8/2002 | Denen et al. | |
| 2004/0046082 A1* | 3/2004 | Itoh | 242/564.1 |
| 2005/0167544 A1* | 8/2005 | Elliott et al. | 242/597.8 |
| 2006/0108467 A1* | 5/2006 | Elliott et al. | 242/559.2 |
| 2008/0018302 A1* | 1/2008 | Reinsel et al. | 320/124 |
| 2008/0128446 A1* | 6/2008 | Kuehneman et al. | 221/10 |
| 2009/0272836 A1* | 11/2009 | Byrd et al. | 242/563 |
| 2014/0158809 A1* | 6/2014 | Borke | 242/563 |

OTHER PUBLICATIONS

International Search Report and the Written Opinion of the International Searching Authority for International Application No. PCT/US2013/073784; date of mailing Mar. 4, 2014; International Filing Date: Dec. 9, 2013; Applicant: Georgia-Pacific Consumer Products LP; 6 pages.

MOD Brochure for MOD Dispenser System sold by Kimberly-Clark Professional; Undated; www.kcprofessional.com; 7 pages.

* cited by examiner

DISPENSER HAVING MORE THAN ONE OUTPUT DRIVE CONDITION

CROSS REFERENCE TO RELATED APPLICATIONS

This application claims the benefits of the legally related U.S. Provisional Patent Application Ser. No. 61/735,594 filed Dec. 11, 2012, which is fully incorporated herein by reference.

BACKGROUND OF THE INVENTION

The present disclosure relates generally to a dispensing apparatus, and more particularly to a product dispensing apparatus having more than one output drive condition.

Product dispensers typically include sheet product dispensers that house multiple rolls of sheet product. The sheet product dispensers are typically arranged to allow maintenance personnel to utilize a partially depleted roll, also referred to as a "stub roll." This partially depleted or stub roll is usually placed in a position to dispense sheet product first to maximize the utilization of sheet product and minimize waste. A second roll, usually a full roll, is also placed within the sheet product dispenser to be used once the stub roll has been depleted.

While some sheet product dispensers merely store the full roll for later manual refilling by maintenance personnel, it is generally preferred to have the full roll automatically dispense once the stub roll is depleted. The automatic dispensing of the full roll allows maintenance personnel responsible for the dispenser to increase the time period between maintenance visits, thus decreasing operating costs and minimizing waste. Sheet product is generally dispensed using a roller system where the sheet product is passed between a drive roller and a pinch roller and the resulting friction pulls the sheet product from the dispensing roll.

The switch from the stub roll to the full roll may be accomplished using a bar that pushes the end (tail portion) of the full roll of sheet product into the rollers. Once the sheet product of the secondary roll has been positioned against the rollers, the resulting friction pulls the sheet product through the rollers and is thereafter dispensed to the user. It is desirable to minimize waste in the operation of the sheet product dispenser to minimize costs. However, it is also desirable to have sheet product available when the user activates the sheet product dispenser. Such requirements often result in double sheeting, where the drive system is set to have the full roll dispense prior to complete depletion of the stub roll, which increases the dispensing resistance. Such requirements may also require breakage of the adhesive holding the sheet product of the stub roll to the axial tube of the stub roll when paper on the stub roll is fully depleted, which also increases the dispensing resistance. In addition, variations in roll diameter, core diameter, product characteristics such as weight, and other dispensing conditions such as wrinkled or crumpled product may increase the dispensing resistance. As such, a dispenser drive system must be capable of overcoming this increased dispensing resistance in order to have sheet product available when the user activates the dispenser.

Typical dispensers address this increased dispensing resistance by utilizing a drive system that is only configured to overcome the highest dispensing resistance, which typically occurs only a fraction of the time the dispenser is used. A drive motor designed to overcome the highest dispensing resistance is unlikely to operate efficiently for the majority of the time where the dispensing resistance is not elevated, thereby resulting in wasted energy.

While existing product dispensers are suitable for their intended purposes, there still remains a need for improvements, particularly regarding the efficiency of operation of the dispenser.

This background information is provided to reveal information believed by the applicant to be of possible relevance to the present invention. No admission is necessarily intended, nor should be construed, that any of the preceding information constitutes prior art against the present invention.

BRIEF DESCRIPTION OF THE INVENTION

An embodiment of the invention is a dispenser, including a product housing configured to receive a product to be dispensed and a drive system including a motive power device and a controller, the drive system configured to receive energy from an energy supply. The dispenser also includes a dispensing apparatus disposed in operable communication with the drive system, the dispensing apparatus configured and disposed in operable communication with the product housing to dispense the product. During a condition when the product is being dispensed the dispensing apparatus is subject to a dispensing resistance and the drive system provides an output to the dispensing apparatus to overcome the dispensing resistance, the output being characterized by a dispensing parameter. The controller receives the dispensing parameter and responsively operates the motive power device, such that the controller operates the motive power device in a first output drive condition in response to the dispensing parameter being below a threshold value, and operates the motive power device in a second output drive condition in response to the dispensing parameter being above a threshold value.

In another embodiment of the invention is a dispenser including a product housing configured to receive a product to be dispensed and a drive system including a primary motive power device and a secondary motive power device, the drive system configured to receive energy from an energy supply. The dispenser also includes a dispensing apparatus disposed in operable communication with the drive system, the dispensing apparatus configured and disposed in operable communication with the product housing to dispense the product. During a condition when the product is being dispensed the dispensing apparatus is subject to a dispensing resistance and the drive system provides an output to the dispensing apparatus to overcome the dispensing resistance, the output being characterized by a dispensing parameter. The secondary motive power device is operably responsive to the dispensing parameter, such that the secondary motive power device operates in a first output drive condition in response to the dispensing parameter being below a threshold value, and operates in a second output drive condition in response to the dispensing parameter being above a threshold value.

In yet another embodiment of the invention is a dispenser including a product housing configured to receive a product to be dispensed and a drive system including a primary motive power device, a secondary motive power device and a controller, the drive system configured to receive energy from an energy supply. The dispenser also includes a dispensing apparatus disposed in operable communication with the drive system, the dispensing apparatus configured and disposed in operable communication with the product housing to dispense the product. During a condition when the product is being dispensed the dispensing apparatus is subject to a dispensing resistance and the drive system provides an output to the dispensing apparatus to overcome the dispensing resistance, the output being characterized by a dispensing parameter. The controller receives the dispensing parameter and responsively operates the secondary motive power device, such that the controller operates the secondary motive power device in a first output drive condition in response to the dispensing parameter being below a threshold value, and operates the secondary motive power device in a second output drive condition in response to the dispensing parameter being above a threshold value.

BRIEF DESCRIPTION OF THE DRAWINGS

Referring to the exemplary non-limiting drawings wherein like elements are numbered alike in the accompanying Figures.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

An embodiment of the invention, as shown and described by the various figures and accompanying text, includes a dispenser having a drive system configured to dispense a product under a first situation where the product is dispensed with a first output drive condition from the drive system, and under a second situation where the product is dispensed with a second output drive condition from the drive system, the second output drive condition being sufficient to overcome a higher dispensing resistance that cannot be overcome as quickly, if at all, by the first output drive condition.

While an embodiment described herein depicts a sheet product dispenser as an example dispenser in accordance with an embodiment of the invention, it will be appreciated that the disclosed invention is also applicable to other product dispensers, such as a soap product dispenser, for example. As used herein, the term dispense may include any portion of a full dispense cycle, which includes, but is not limited to, preparing product for a user, delivering product to a user, monitoring product delivery, and monitoring product receipt.

Figure 1:
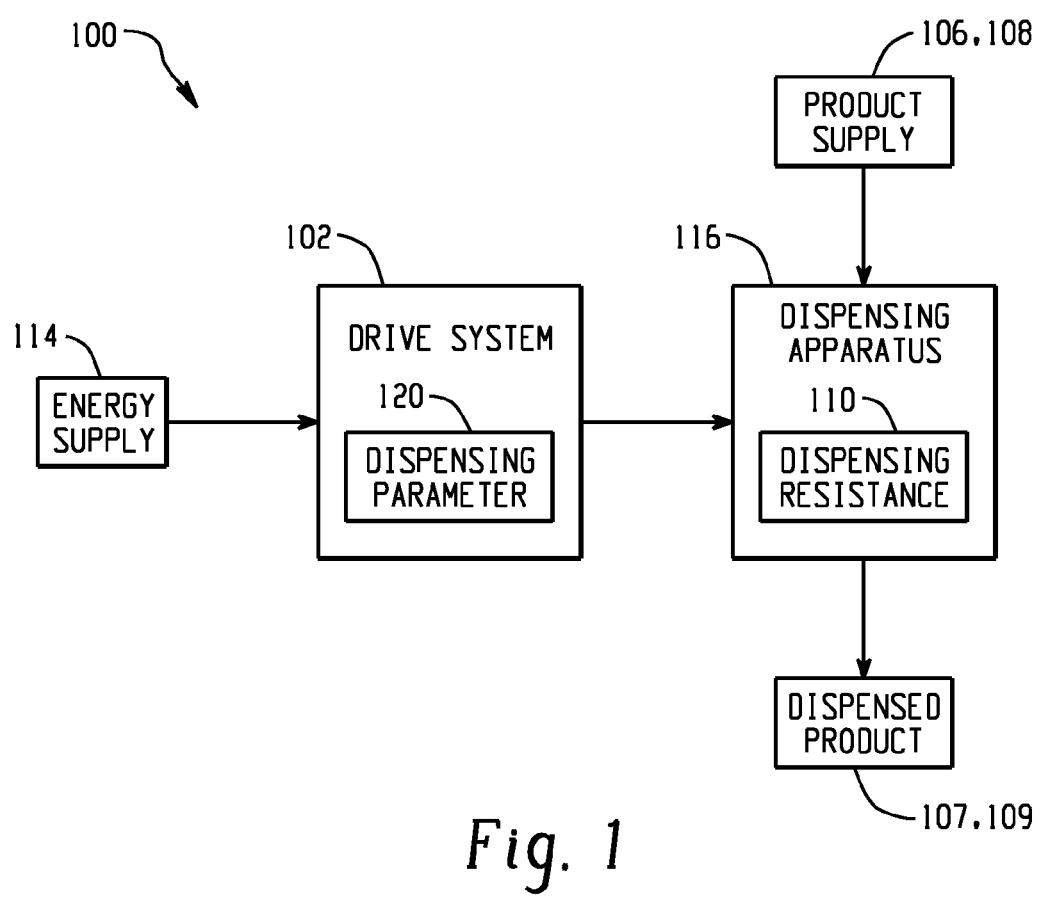
FIG. 1 depicts a block diagram schematic of a dispenser in accordance with an embodiment.

FIG. 1 depicts a block diagram of a dispenser 100 in accordance with an embodiment of the invention. As illustrated, the dispenser 100 includes a drive system 102 coupled to a dispensing apparatus 116. The drive system 102 receives energy from an energy supply 114 and the dispensing apparatus 116 receives a product to be dispensed from a product supply 106, 108. The drive system 102 controls the dispensing of the product 107, 109 by controlling the operation of the dispensing apparatus 116. In an embodiment, the dispensed product 107, 109 may be a sheet product received from a stub roll 108 or a full roll 106. It will be appreciated that when the full roll 106 provides sheet product to a user, such sheet product is referred to as sheet product 107. Alternatively, when the stub roll 108 provides sheet product to a user, such sheet product is referred to as sheet product 109. FIG. 1 illustrates the product supply originating from either the full roll 106 or the stub roll 108, and illustrates the corresponding dispensed product being sheet product 107, 109, respectively.

When a product is being dispensed, a dispensing resistance 110 is experienced by the dispensing apparatus 116, which may manifest itself in the form of inertia, friction, viscosity, tearing, pressure, interference, or compression for example, and affects the amount of force or torque required from the drive system 102 to dispense the product. An elevated dispensing resistance 110 can occur due to wrinkled product, crumpled product, deformed product, misalignment, dimensional variations, or other reasons. In an embodiment employing a full roll 106 and a stub roll 108, an elevated dispensing resistance 110 can also occur during depletion of the stub roll 108 and transfer from the stub roll 108 to the full roll 106 for continued sheet dispensing. Such an elevated dispensing resistance 110 may be due to double sheeting, separation of an adhered portion of the end of the sheet product from a spindle of the stub roll 108, or both, or for other reasons.

In accordance with an embodiment of the invention, and as compared with existing dispensers, overall energy consumption relating to product dispensing can be reduced by configuring the drive system 102 to operate efficiently when the dispensing apparatus 116 is experiencing both a low dispensing resistance condition (such as under normal dispensing of sheet product from the body of the full roll 106 for example) and under an elevated dispensing resistance condition (such as during depletion of the stub roll 108 and transfer from the stub roll 108 to the full roll 106 for example). In an embodiment, during the elevated dispensing resistance condition an increase of torque, force, work, power, or the like is output from the drive system 102 to the dispensing apparatus. Various electrical and mechanical systems for increasing the output of the drive system 102 will be discussed in more detail below.

Figure 2:
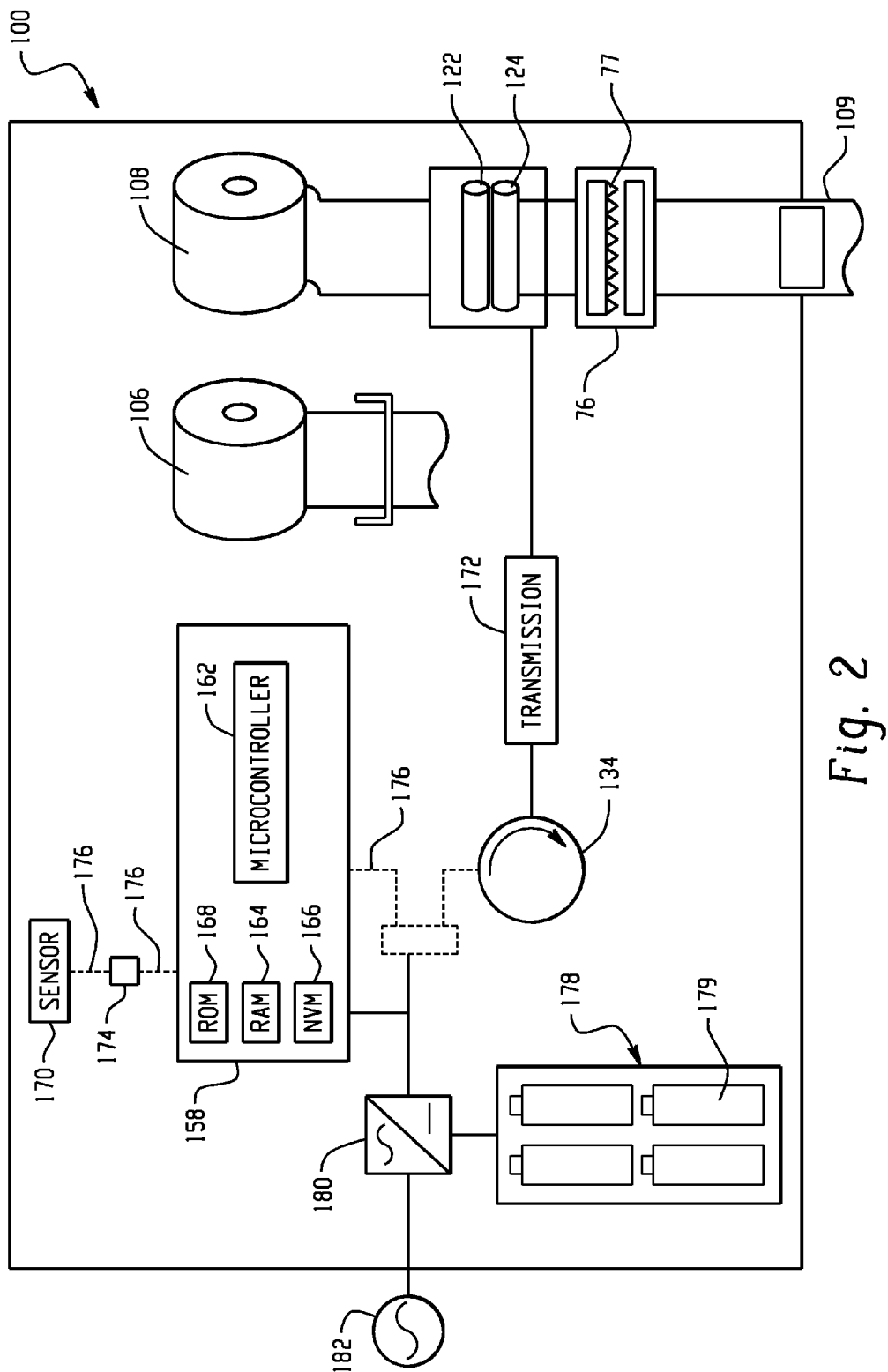
FIG. 2 depicts a block diagram schematic of a sheet product dispenser in accordance with an embodiment.

In exemplary embodiments, the energy supply 114 could be batteries, such as four D-cell batteries for example, or could be an alternating current "AC" power source provided by a utility or other means for example. However, the energy supply could also be provided by a spring, human power, solar power, wind power, or any other device suitable for the purposes disclosed herein. In exemplary embodiments, the drive system 102 may include a motor, actuator, spring, lever, pulley, gear, or any other device or plurality of devices capable of producing work output in a manner suitable for the purposes disclosed herein. In exemplary embodiments, the dispensing apparatus 116 may include a drive roller, a pinch roller, a drive belt, a drive gear, a pump, a plunger, or any other device capable of facilitating dispensing of product in a manner suitable for the purposes disclosed herein Referring now to FIG. 2, a block diagram of a dispenser 100 in an embodiment configured for sheet product is shown. It should be appreciated that the illustration in FIG. 2 is for purposes of description and that the presence, relative size, and placement of the respective components may differ. In an embodiment, the sheet product dispenser 100 includes a microprocessor-based main controller 158, which provides logic and controls functionality used during operation of the sheet product dispenser 100. Alternatively, the functionality of the main controller 158 may be distributed to several controllers that each provides more limited functionality to discrete portions of the operation of sheet product dispenser 100. In one embodiment, the main controller 158 is coupled to a drive roller 122 via a motor 134 and an optional transmission assembly 172. The optional transmission assembly 172, such as a gearbox for example, adapts the rotational output of the motor 134 for the dispensing of the sheet product from the full roll 106 or the stub roll 108. Alternatively, the motor 134 may contain an integrated gearbox, commonly known as a gearmotor, and the term "motor" as used herein refers to all motors with or without an integrated gearbox.

In exemplary embodiments, the main controller 158 is a suitable electronic device capable of accepting data and instructions, executing the instructions to process the data, and presenting the results. The main controller 158 may accept instructions through a user interface, or through other means such as but not limited to a proximity sensor, voice activation means, manually-operable selection and control means, radiated wavelength and electronic or electrical transfer. Therefore, the main controller 158 can be, but is not limited to an electrical circuit, a microprocessor, microcomputer, a minicomputer, an optical computer, a board computer, a complex instruction set computer, an ASIC (application specific integrated circuit), a reduced instruction set computer, an analog computer, a digital computer, a molecular computer, a quantum computer, a cellular computer, a solid-state computer, a single-board computer, a buffered computer, a computer network, a desktop computer, a laptop computer, a personal digital assistant (PDA) or a hybrid of any of the foregoing.

The main controller 158 is capable of converting an analog voltage or current level provided by sensors, such as a proximity sensor 170 for example, into a digital signal indicative of a user placing their hand in front of the sheet product dispenser 100. Alternatively, the proximity sensor 170 may be configured to provide a digital signal to the main controller 158, or an analog-to-digital (A/D) converter 174 may be coupled between proximity sensor 170 and the main controller 158 to convert the analog signal provided by the proximity sensor 170 into a digital signal for processing by the main controller 158. The main controller 158 uses the digital signals as input to various processes for controlling the sheet product dispenser 100. The digital signals represent one or more sheet product dispenser data including but not limited to proximity sensor activation, stub roll empty, tear bar activation, motor current, motor back electromotive force, battery level and the like. It should be appreciated that in some embodiments, the main controller 158 may be arranged to also include one or more direct analog inputs to receive one or more analog signals instead of or in addition to digital signals.

In exemplary embodiments, the main controller 158 is operably coupled with one or more components of sheet product dispenser 100 by data transmission media 176, which includes, but is not limited to, solid-core wiring, twisted pair wiring, coaxial cable, and fiber optic cable. The data transmission media 176 also includes, but is not limited to, wireless, radio and infrared signal transmission systems. The main controller 158 is configured to provide operating signals to these components and to receive data from these components via the data transmission media 176. The main controller 158 communicates over the data transmission media 176 using a well-known computer communications protocol such as Inter-Integrated Circuit (I2C), Serial Peripheral Interface (SPI), System Management Bus (SMBus), Transmission Control Protocol/Internet Protocol (TCP/IP), RS-232, ModBus, or any other communications protocol suitable for the purposes disclosed herein.

In an embodiment, the electrical energy for operating the sheet product dispenser 100 is provided by a battery 178, which may be comprised of one or more batteries arranged in series or in parallel to provide the desired energy. In an embodiment, the battery 178 includes four 1.5-volt "D" cell batteries 179. The battery 178 is connected to the main controller 158 via an optional power converter 180 that adapts the electrical output of the battery 178 to that desired for operating the sheet product dispenser 100. The optional power converter 180 may also accept an input from an external power source, such as an alternating current ("AC") power source 182 or a solar power source, or any other alternative power source as may be appropriate for an application. The AC power source 182 may be any conventional power source, such as a 120V, 60 Hz wall outlet for example.

A tear bar assembly 76, which includes a serrated tear bar 77, is positioned adjacent the dispensing chute to provide a means for separating the dispensed sheet product from the stub roll 108 or the full roll 106, depending on which roll is, or if both rolls are, actively involved in the dispensing of sheet product.

Figure 3:
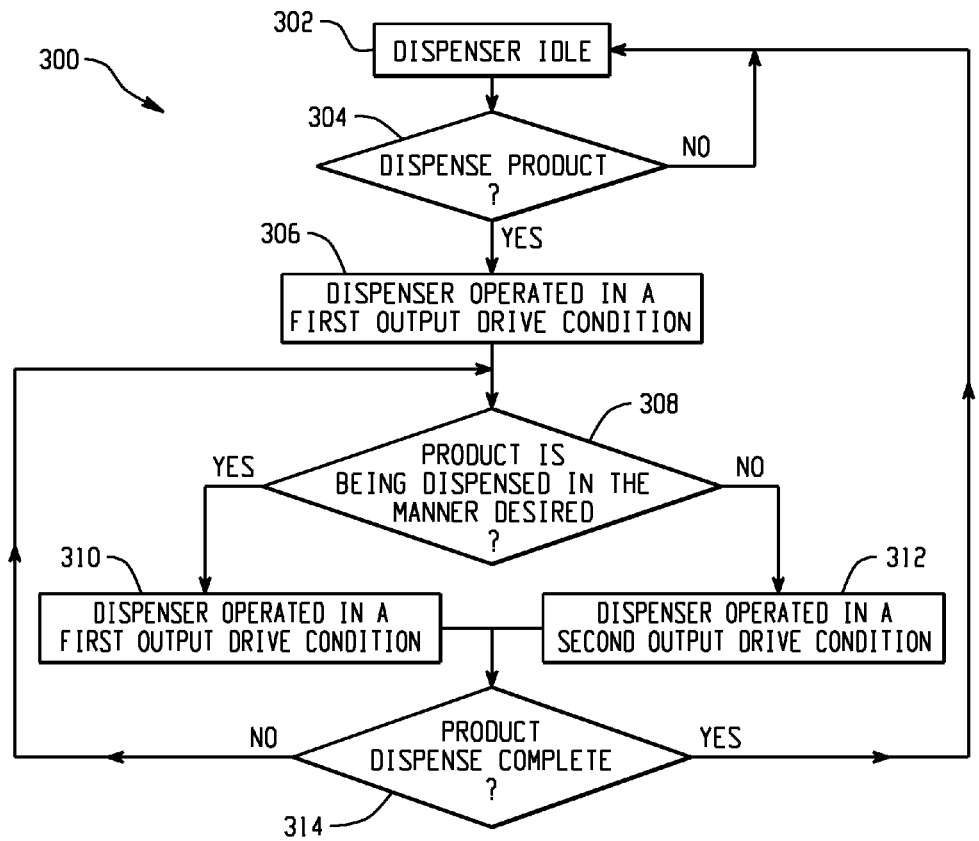
FIG. 3 depicts a flowchart of a method for using the dispenser of FIG. 1 in accordance with an embodiment.

Referring now to FIG. 3, a flow chart illustrating a method 300 for controlling the dispenser 100 in accordance with an embodiment is shown. At block 302, which represents the start of the method 300, the dispenser 100 is idle. As shown at decision block 304, the dispenser 100 determines whether it should be dispensing product. In exemplary embodiments, the dispenser 100 may determine if it should be dispensing a product by receiving a signal from a proximity sensor. If the dispenser 100 should be dispensing product, then the method 300 advances to block 306 where the drive system 102 of dispenser 100 is operated in a first output drive condition in an effort to dispense product. In exemplary embodiments, the first output drive condition is configured to be able to dispense product from the dispenser 100 during normal operating conditions of the dispenser 100. Next, as shown at decision block 308, the dispenser 100 determines if the product is being dispensed in a manner desired. In exemplary embodiments, when operating in the first output drive condition the dispenser may not be able to dispense the product in the manner desired due to an elevated dispensing resistance 110. For example, if the dispenser 100 is dispensing the product at or above a desired speed, the dispenser 100 might be considered to be dispensing in the manner desired. If the product is being dispensed in the manner desired, the dispenser 100 continues to operate in the first output drive condition, as shown at block 310. If the product is not being dispensed in the manner desired, the dispenser is operated in a second output drive condition, as shown at block 312. In exemplary embodiments, the second output drive condition is configured to be able to dispense product from the dispenser 100 when the dispenser 100 is experiencing an elevated dispensing resistance 110. As shown at decision block 314, while the dispenser 100 is being operated in either the first or second output drive condition the dispenser 100 determines if the product dispense cycle is complete. Once the product dispense has been completed, the dispenser 100 is again idle, as shown at block 302. Otherwise, the dispenser 100 continues to monitor if the product is being dispensed in the manner desired, as shown at decision block 308.

In one embodiment, during the first output drive condition a first level of torque can be applied to the drive roller 122 from the drive system 102 and during the second output drive condition a second level of torque, which is greater than the first level of torque, can be applied to the drive roller 122 from the drive system 102. In exemplary embodiments, an output drive condition may result in a force, speed, pressure, work, power, or any other output drive condition producible by the dispenser 100. As used herein, the torque, force, speed, pressure, work, power, or other condition required to overcome dispensing resistance 110 are collectively referred to as dispensing parameters 120 associated with the product being dispensed. That is, if the product being dispensed is a roll of sheet product via a drive roller 122, then the dispensing parameter 120 may be the torque required to unroll the sheet product (torque resistance against the drive roller 122 of the dispensing apparatus 116), and if the product being dispensed is a soap via a pump, then the dispensing parameter 120 may be the pressure required to pump the soap out of a reservoir.

As will be appreciated from the foregoing, the dispensing parameter 120 being monitored by the dispenser 100 may be the torque required by the dispensing apparatus 116 to dispense the product. For example, where the monitored torque provided to the dispensing apparatus 116 has a value less than a threshold torque, the dispensing apparatus 116 is operating against a low dispensing resistance 110 and when the monitored torque provided to the dispensing apparatus 116 is greater than the threshold torque the dispensing apparatus 116 is operating against an elevated dispensing resistance 110. In exemplary embodiments, the drive system 102 is configured to operate in a first output drive condition when a low dispensing resistance is detected and in a second output drive condition when an elevated dispensing resistance is detected.

Also from the foregoing, it will be appreciated that in exemplary embodiments the dispensing parameter 120 being monitored could be a dispensing speed. For example, where the monitored dispensing speed has a value higher than a threshold speed, the dispensing apparatus 116 is operating against a low dispensing resistance 110 and when the monitored dispensing speed is less than the threshold speed the dispensing apparatus 116 is operating against an elevated dispensing resistance 110. In exemplary embodiments, the drive system 102 is configured to operate in a first output drive condition when a low dispensing resistance is detected and in a second output drive condition when an elevated dispensing resistance is detected.

In exemplary embodiments, the dispenser 100 can utilize functionality of the main controller 158 to determine whether to implement the first output drive condition or the second output drive condition. However, in other exemplary embodiments, the dispenser 100 may utilize one or more mechanical schemes or analog circuit control schemes to determine whether to implement the first output drive condition or the second output drive condition. In exemplary embodiments, various electrical and mechanical methods and systems can be utilized for implementing the first output drive condition and the second output drive condition.

Figure 4:
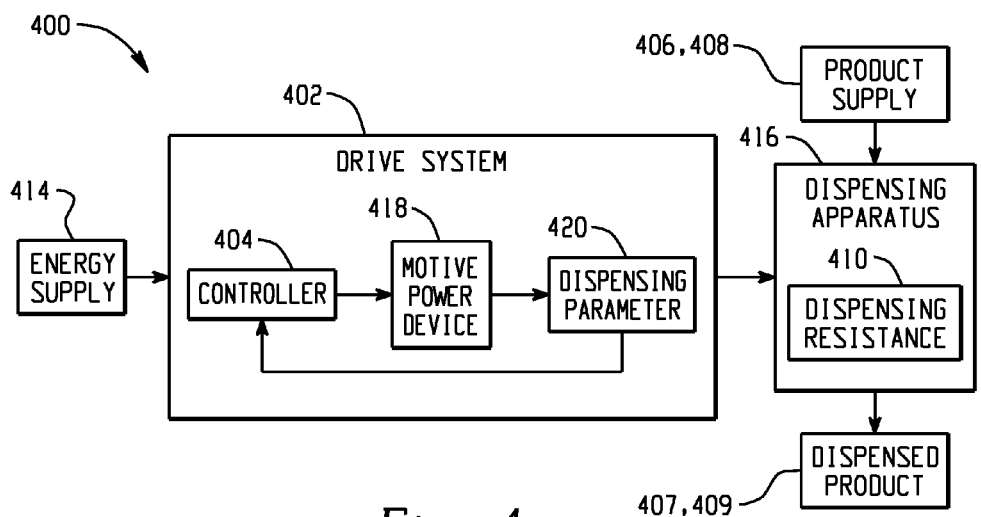
FIG. 4 depicts a block diagram schematic of a dispenser configured for electrically increasing the output drive condition in accordance with an embodiment.

Referring now to FIG. 4, a block diagram of a dispenser 400 configured for electrical control of the output drive condition of the dispenser 400 in accordance with an embodiment of the invention is shown. The drive system 402 receives power from the energy supply 414 and delivers conditioned power to the motive power device 418. In addition, a controller 404 may be configured to receive a signal indicating that the dispenser should be activated and responsively instruct the motive power device 418 to dispense a product. In exemplary embodiments, a controller 404 can be configured to perform power conditioning on the supplied power and to provide conditioned power to the motive power device 418. For example, the controller 404 may receive a twelve volt power signal and may use pulse width modulation techniques, voltage conversion techniques, or other techniques to provide an equal or lower power signal to the motive power device 418. In addition, the controller 404 receives one or more signals indicative of the dispensing parameter 420 being produced by the motive power device 418. Based on the dispensing parameter 420, the controller 404 responsively controls the power provided to the motive power device 418 thereby controlling the mode of operation of the drive system 402. In exemplary embodiments, the dispensing parameter 420 may be the torque, rotational force, or speed produced by the motive power device 418. In one embodiment, the motive power device 418 may be a motor 134 and the dispensing parameter 420 may be a back EMF voltage produced by the motor 134.

Figure 5:
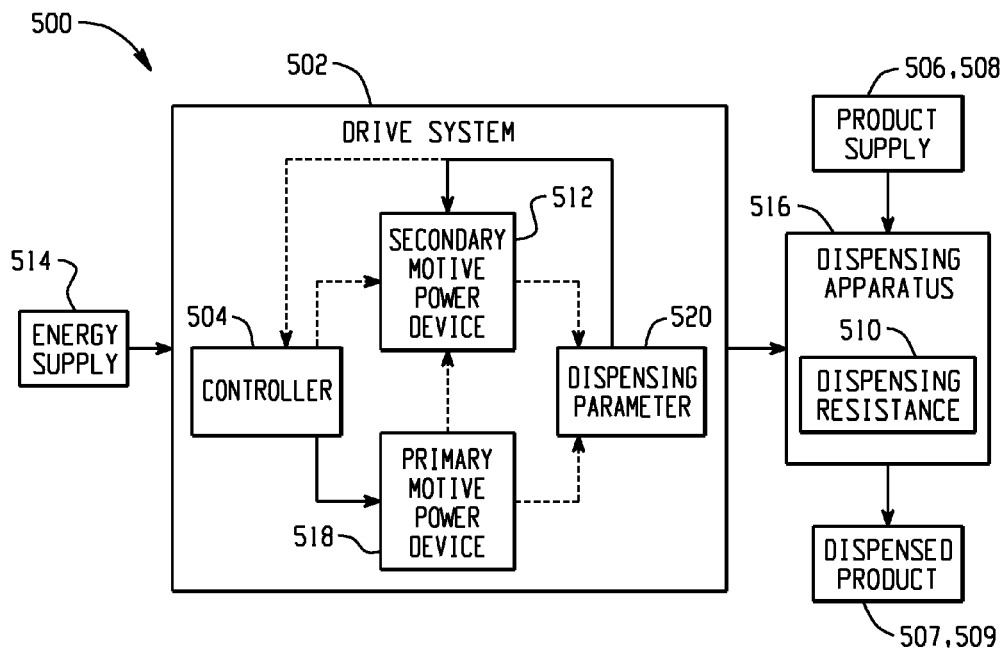
FIG. 5 depicts a block diagram schematic of a dispenser configured for mechanically increasing the output drive condition in accordance with an embodiment.

Referring now to FIG. 5, a block diagram is shown of a dispenser 500 configured for one or more mechanical schemes of implementing the output drive condition of the dispenser 500 in accordance with an embodiment of the invention is shown. The drive system 502 may include a controller 504 that may be configured to receive power from the energy supply 514, perform power conditioning on the supplied power, and deliver conditioned power to the primary motive power device 518 and/or the secondary motive power device 512. In addition, the controller 504 may be configured to receive a signal indicating that the dispenser should be activated and responsively instruct the primary motive power device 518 to dispense a product. In exemplary embodiments, the primary motive power device 518 may include a motor, actuator, spring, lever, pulley, or any other device or plurality of devices capable of producing work output in a manner suitable for the purposes disclosed herein. In addition, the secondary motive power device 512 may include a motor, actuator, spring, lever, pulley, one-way bearing, transmission, gear, mechanical impact device, or any other device which is configured to operate differently, if at all, during a second output drive condition as compared to a first output drive condition. The drive system 502 is configured to monitor a dispensing parameter 520 that it is producing and to responsively control the mode of operation of the secondary motive power device 512. In exemplary embodiments, the dispensing parameter 520 may be the torque, rotational force or speed produced by the drive system 502 and provided to the dispensing apparatus 516.

Electrical Control

Figure 6:
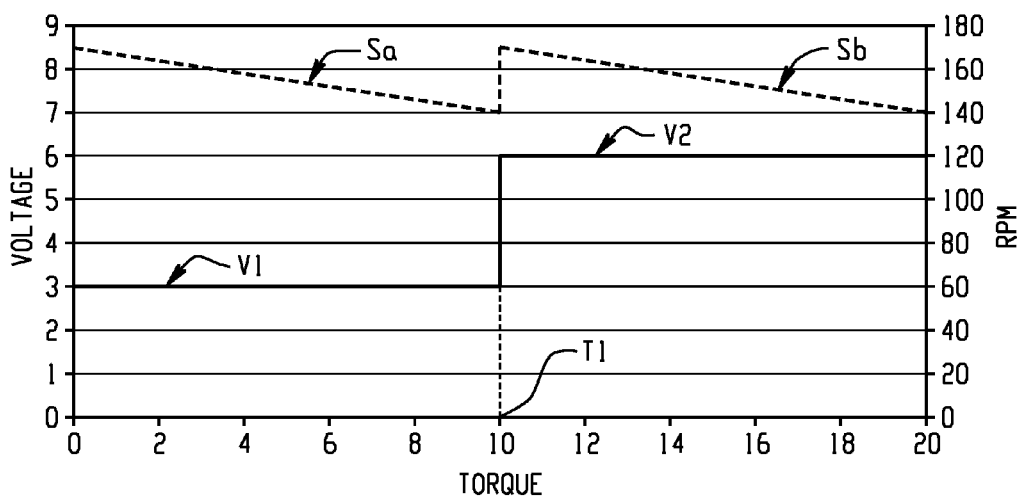
FIG. 6 depicts an input voltage characteristic in accordance with an embodiment.
Figure 7:
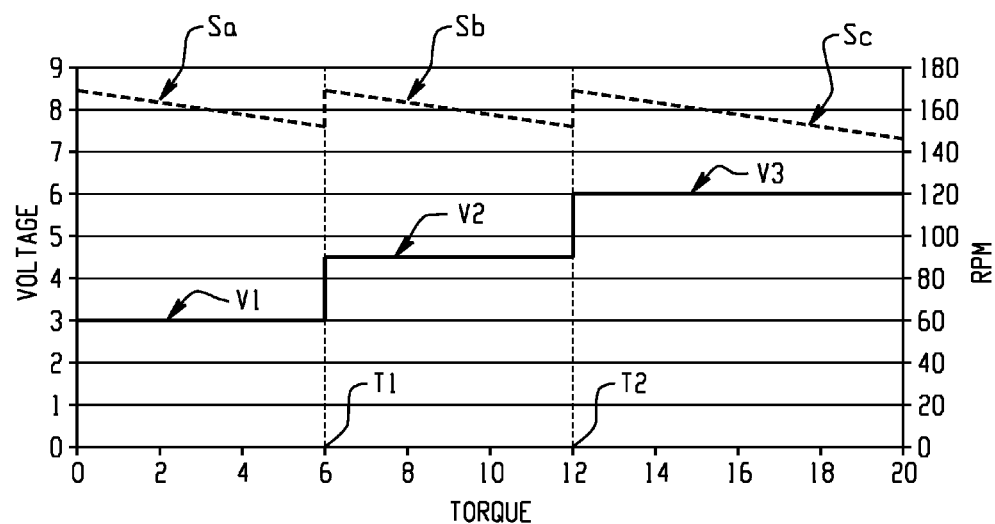
FIG. 7 depicts another input voltage characteristic in accordance with an embodiment.
Figure 8:
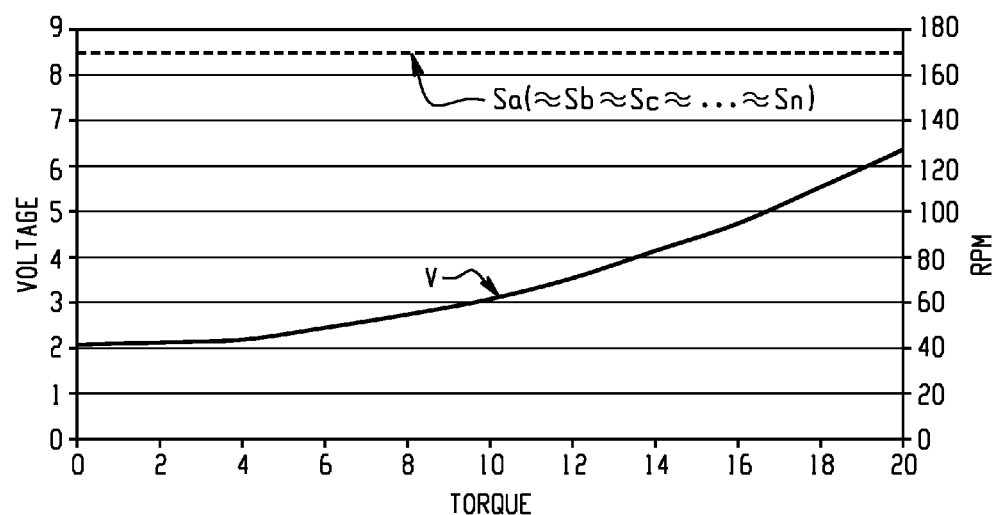
FIG. 8 depicts another input voltage characteristic in accordance with an embodiment of the invention.

In one embodiment, such as depicted in FIG. 4, during a first output drive condition a first voltage is supplied from the controller 404 to the motive power device 418 and during a second output drive condition a voltage greater than the first voltage is supplied by the controller 404 to the motive power device 418, thereby causing the motive power device 418 to generate a larger output torque. Referring now to FIGS. 6-8, graphs illustrating various multi-drive condition schemes are shown where the controller 404 monitors a dispensing parameter 420, such as a speed or torque produced by the motive power device 418, to determine whether to operate in the first output drive condition or the second output drive condition.

In the embodiment depicted by FIG. 6, the dispensing parameter is the torque that the motive power device 418, such as a motor 134, is producing to overcome dispensing resistance 110. A torque threshold T1 is depicted having a torque value of 10 torque units. If the torque required for dispensing product is less than 10, then the controller 404, or other electrical circuit suitably configured for the purpose disclosed herein, provides a first voltage V1 of 3V to the motive power device 418, and if the torque required is greater than 10, then the controller 404 provides a second voltage V2 of 6V to the motive power device 418. In one embodiment, the first voltage V1 of 3V may result in a dispensing speed Sa between 140 to 170 rpm, the second voltage V2 of 6V may result in a dispensing speed Sb between 140 to 170 rpm, i.e., Sa and Sb are substantially equal. Notwithstanding the foregoing example, it will be appreciated that the illustrated threshold torque value of 10 torque units, the illustrated input voltage levels of 3V and 6V, and the illustrated dispensing speed of 140 to 170 rpm, are arbitrary values for discussion purposes only, and that the scope of the invention is not limited to any particular torque threshold value T1, any particular input voltage levels, or any particular dispensing speeds.

In the embodiment depicted by FIG. 7, there are two torque thresholds T1 and T2, where T1 is depicted having a torque value of 6 torque units, and T2 is depicted having a torque value of 12 torque units. If the torque required for dispensing product is less than 6, then the controller 404 provides a voltage V1 of 3V to the motive power device 418 resulting in a dispensing speed Sa between 152 rpm and 170 rpm; if the torque required is between 6 and 12, then the controller 404 provides a voltage V2 of 4.5V to the motive power device 418 resulting in a dispensing speed Sb between 152 rpm and 170 rpm; and, if the torque required is greater than 12, then the controller 404 provides a voltage V3 of 6V to the motive power device 418 resulting in a dispensing speed Sc between 146 rpm and 170 rpm. In this embodiment, the dispensing speeds Sa, Sb, and Sc are more substantially equal to each other as compared to the embodiment depicted by FIG. 6, thereby providing a perceptibly more consistent dispensing operation.

In the embodiment depicted by FIG. 8, there are an infinite number of torque thresholds, or alternatively, there are a defined number of discrete torque thresholds arranged along a continuum (discrete points along the curve of FIG. 8 for example). As the torque required for dispensing increases above one of the discrete thresholds, the controller 404 provides an increased voltage V to the motive power device 418, resulting in a substantially constant, continuous dispensing speed Sa. The curve of FIG. 8 may be analog-based, where the voltage V to the motive power device 418 varies functionally with the sensed torque, or digital-based, where the voltage V to the motive power device 418 varies according to a defined set of x-y data points used to define the curve of FIG. 8, which may be accessed by the controller 404 via a lookup table stored in memory 164, 166 or 168 for example.

Figure 9:
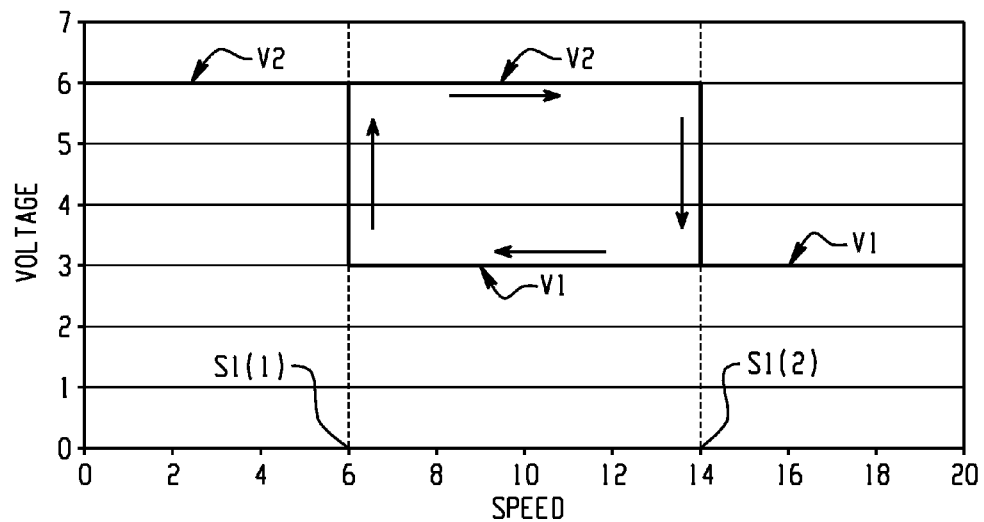
FIG. 9 depicts another input voltage characteristic in accordance with an embodiment.

From the foregoing description of FIGS. 6, 7, and 8 relating to voltage as a function of torque, and from the foregoing description of speed being a suitable dispensing parameter, it will be appreciated that an alternate embodiment employing speed as opposed to torque as a dispensing parameter may also be employed. In the embodiment depicted in FIG. 9, there are two speed thresholds S1(1) and S1(2) where S1(1) is depicted having a speed threshold of 6 speed units and S1(2) is depicted having a speed threshold of 14 speed units. If the speed at which product is dispensed is above 14 units, then the controller 404 provides a voltage V1 of 3V to the motive power device 418. As dispensing resistance 410 increases, dispensing speed will decrease. If dispensing speed decreases below the threshold S1(1), then the controller 404 provides a voltage V2 of 6V to the motive power device 418 until dispensing resistance 410 subsides and the voltage V2 causes the dispensing speed to exceed the threshold S1(2), at which time the controller 404 provides a voltage V1 of 3V to the motive power device 418.

Figure 10:
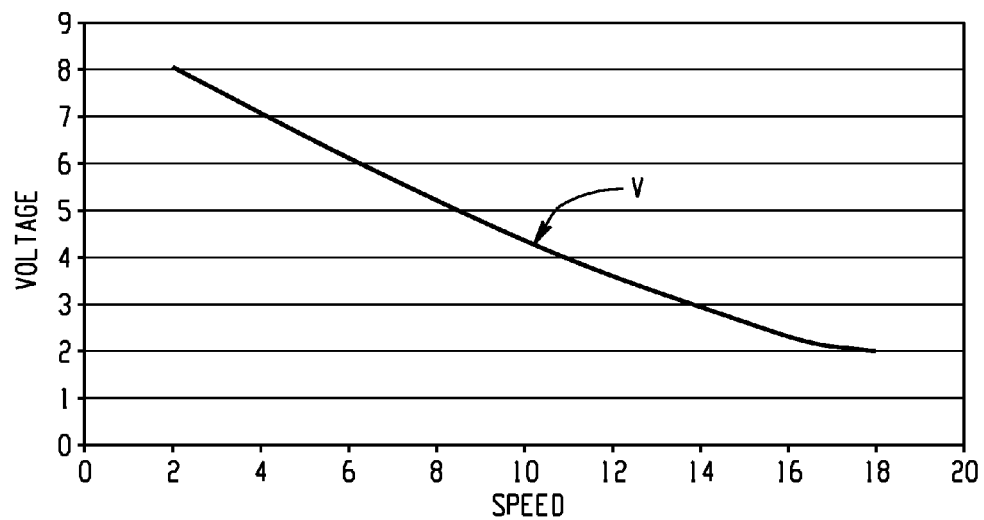
FIG. 10 depicts another input voltage characteristic in accordance with an embodiment.

In the embodiment depicted in FIG. 10, there are an infinite number of speed thresholds, or alternatively, a defined number of discrete speed thresholds arranged along a continuum (similar to the discrete points along the curve of FIG. 8, but where the voltage increases as the speed decreases, for example). As with a system utilizing a torque dispensing parameter, in a system utilizing a speed dispensing parameter the controller 404 will control the voltage to the motive power device 418 according to the established characteristic curve.

In exemplary embodiments, during the first output drive condition a first voltage is applied to the motive power device 418 and during the second output drive condition the voltage applied to the motive power device 418 may be bumped, thereby causing the motive power device 418 to generate an impulse output torque. In various exemplary embodiments, the voltage applied during the second output drive condition the applied voltage may be equal to or greater than the voltage applied during the first output drive condition. The input impulses may be separated by enough time to allow the dispensing apparatus 416 in FIG. 4 to receive the input impulses as discrete, individual events, instead of events that occur so frequently as to appear to the dispensing apparatus 416 as one average, continuous event. As such, the separation time can allow the input impulses to initially generate and accumulate energy within a slack condition in the dispensing apparatus 416, whereby the energy is later released during the input impulse duration as a "jerk", or a "kick", or a similar higher peak output drive condition sufficient to overcome an elevated dispensing resistance 410.

Figure 11:
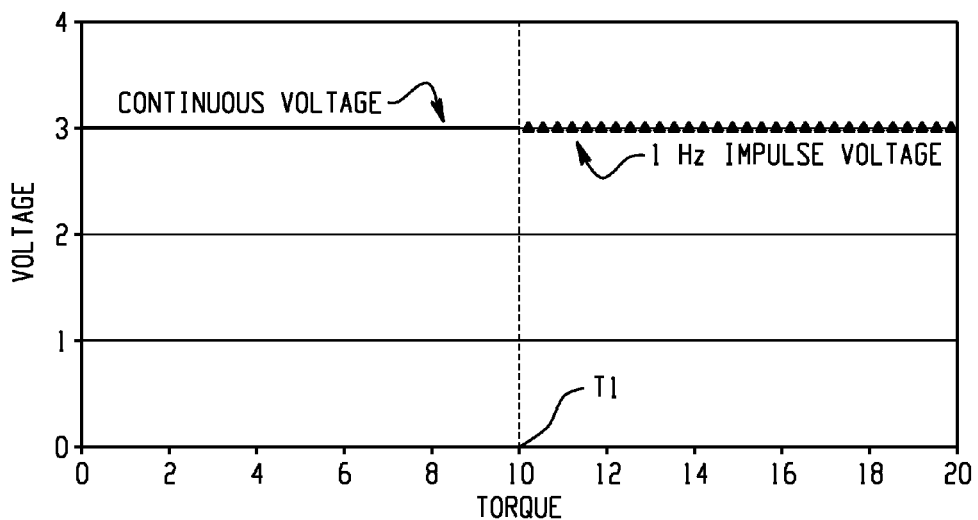
FIG. 11 depicts another input voltage characteristic in accordance with an embodiment.
Figure 12:
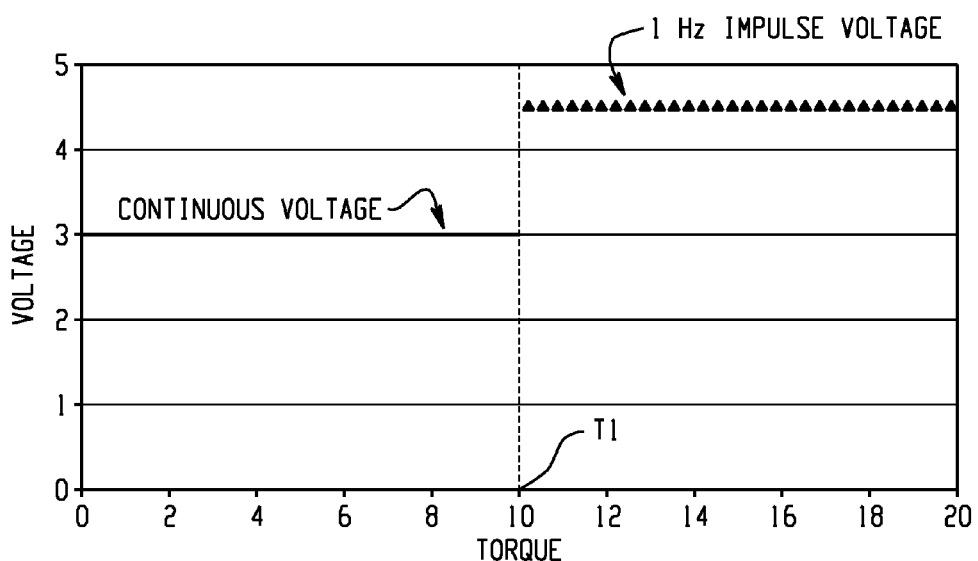
FIG. 12 depicts another input voltage characteristic in accordance with an embodiment.

Referring now to FIG. 11, an embodiment employing a pulsing function as noted above is shown. As illustrated, a torque threshold T1 is depicted with a value of 10. If the torque required for dispensing is less than 10, then the controller 404 provides a continuous voltage of 3V to the motive power device 418. If T is greater than 10, then the controller 404 provides a series of impulse cycles alternating between 0V and 3V at 1 Hertz to the motive power device 418, each impulse voltage pulse lasting a duration of 500 msec. FIG. 12 shows an embodiment employing another pulsing function as noted above. In this embodiment, a torque threshold T1 is depicted with a value of 10. If the torque required for dispensing is less than 10, then the controller 404 provides of continuous voltage of 3V to the motive power device 418. If the torque required for dispensing is greater than 10, then the controller 404 provides a series of increased voltage impulse cycles alternating between 0V and 4.5V at 1 Hertz to the motive power device 418, each impulse voltage pulse lasting a duration of 500 msec. While values such as 3V continuous, 3V impulse, 4.5V impulse, 1 Hertz, and 500 msec are discussed herein, it will be appreciated that these values are for discussion purposes only, and are not and should not be considered limiting in any way to the invention disclosed herein.

With reference back to FIG. 3, at decision block 308, the dispenser determines if the dispenser operating in the first output drive condition is dispensing the product in the manner desired, that is, if the dispensing resistance against the dispensing apparatus in the first output drive condition is less than a threshold condition T1, as shown in FIGS. 11 and 12. If the dispenser is dispensing the product in the manner desired, then the method 300 progresses to block 310 where a continuous input is provided to the motive power device. If the dispenser is not dispensing the product in the manner desired, then the method 300 progresses to block 312 where a discontinuous, or bumped, or non-uniform, input, such as an impulse voltage (FIG. 11) or an elevated impulse voltage (FIG. 12), is provided to the motive power device.

In another exemplary embodiment, the dispenser 100 may include a circuit to drive the dispensing apparatus at a second speed resulting from an elevated voltage input to the motive power device, which is substantially equal to a first speed of the dispensing apparatus that results without the need for an elevated voltage input to the motive power device. As used herein with respect to speed, the term "substantially" is intended to take into consideration slight variations in speed that are not readily discernible to an end user.

Figure 13:
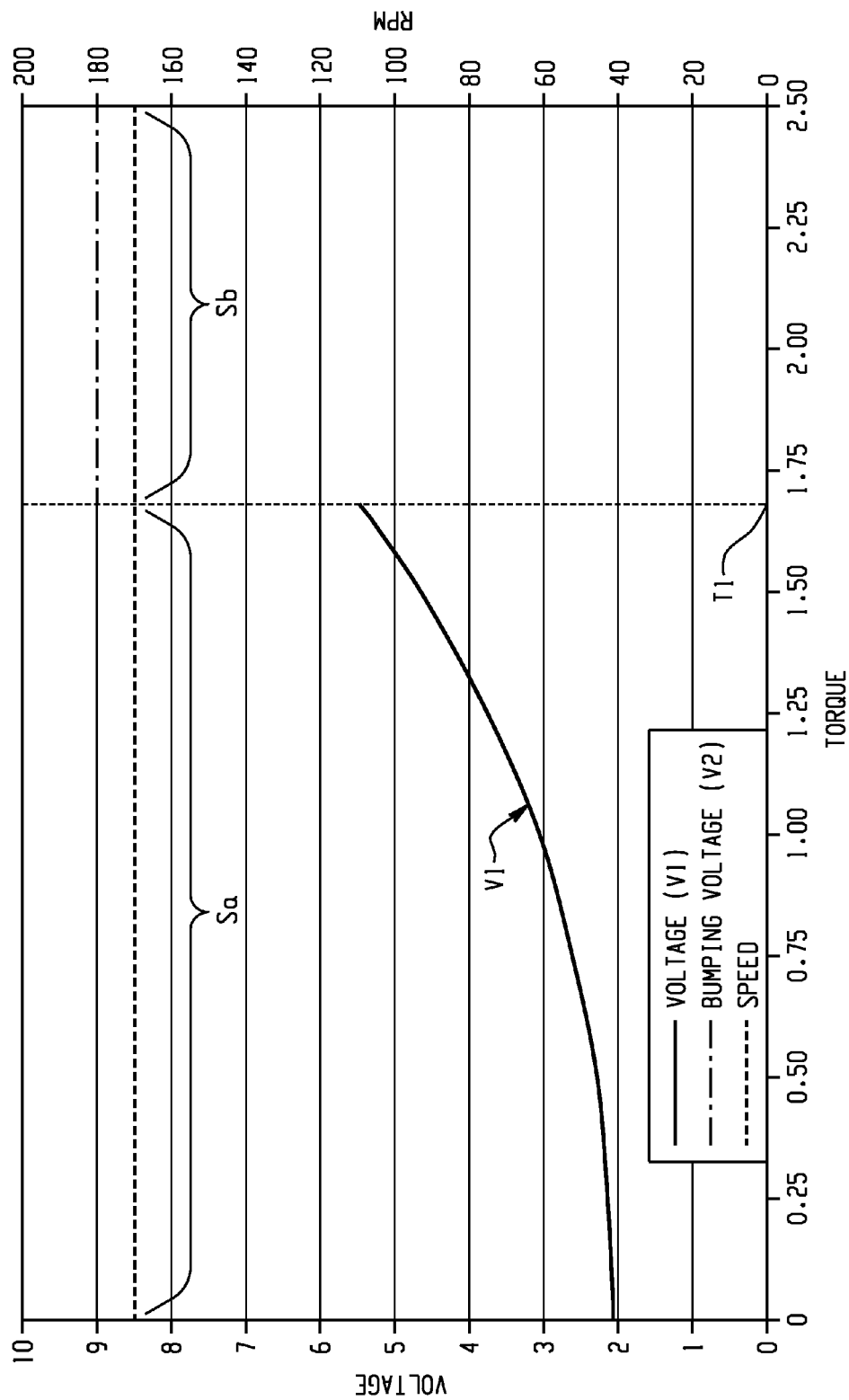
FIG. 13 depicts input and output characteristics for substantially constant output speed in accordance with an embodiment.

Referring now to FIG. 13, input to and output from a motive power device is depicted that would allow the drive system to operate at a substantially constant speed during a dispense operation, and to achieve sufficient torque and/or impulse output to generate the torque requirements for both a normal dispensing operation and a higher-resistance operation such as a roll transfer operation. In an embodiment, the input voltage is a continuous voltage V1, which may be constant, or variable as depicted, for conditions where the dispensing resistance 110 is less than a threshold value and is a non-continuous or non-uniform impulse (bumping) voltage V2 for conditions where the dispensing resistance is greater than a threshold value. As depicted, the output speed of the drive system is a substantially constant first speed Sa in response to the V1 input condition, and is contemplated to be a constant average second speed Sb in response to the V2 input condition. However, it is also contemplated that the average second speed Sb may not be constant, but may functionally vary with factors including the bumping voltage V2, bumping duration, motor current draw, and the dispensing resistance. As depicted, the second speed Sb is contemplated to be substantially the same as the first speed Sa.

It will be appreciated by one skilled in the art that the continuous voltages and the non-continuous, non-uniform voltages depicted in FIGS. 6 through 13 can be achieved by using pulse-width modulation (PWM) techniques.

Figure 14:
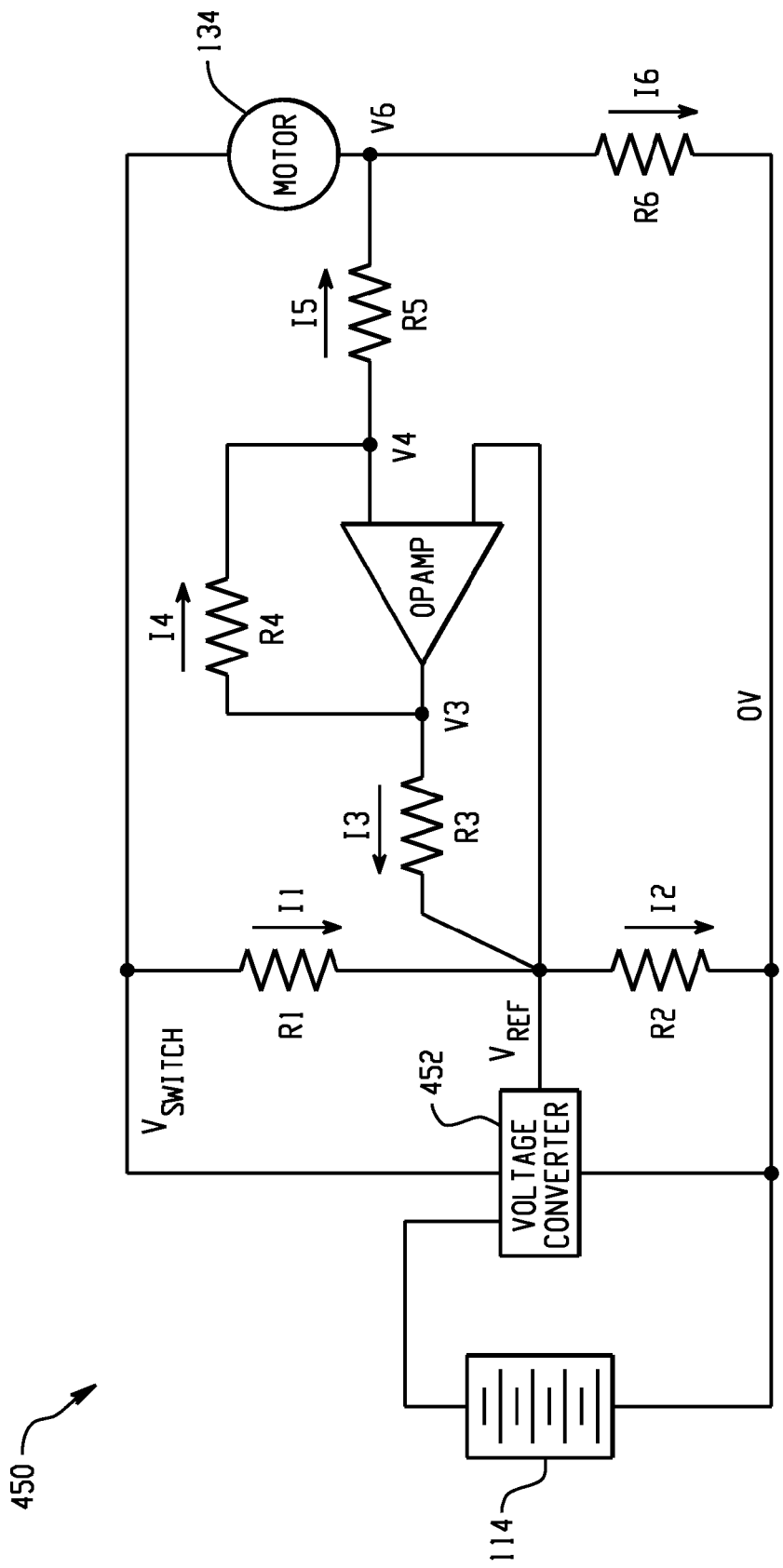
FIG. 14 depicts an electric circuit for providing the substantially constant output speed depicted in FIG. 13.

FIG. 14 depicts an embodiment of a circuit 450 suitable for achieving a substantially constant dispensing speed by producing a voltage that increases with motor current draw as depicted by voltage V1 in FIG. 13. Power supply 114 provides an input voltage to a voltage converter 452 such as a buck converter, a boost converter, a buck/boost converter, or the like. The voltage converter 452 uses the input voltage to produce an output, Vswitch, which will maintain the node Vref at a prescribed voltage, such as 1.24V. The reference voltage Vref is also connected to voltage V4 through an operational amplifier (opamp). The opamp produces an output voltage V3 as necessary to keep the terminal voltage V4 equal to Vref. During a condition when dispensing resistance is at a maximum, the current draw through the motor and resistor R6 is high, causing the voltage V6 to be high, such as 1.24V. During this condition, the opamp produces a voltage V3 of 1.24V so that there is no current I4 and I5 through resistors R4 and R5, which is a necessary condition to maintain V4 at Vref (1.24V). Since the opamp produces a voltage V3 of 1.24V, there is no current I3 through resistor R3. Therefore, the voltage converter must produce a voltage Vswitch high enough to produce enough current I1 through resistor R1 to maintain Vref at 1.24V. As such, the motor 134 receives the high voltage, Vswitch. As the dispensing resistance decreases, the motor current, current I6, and voltage V6 all decrease. The opamp increases the voltage of V3 in order to produce a current I4 and I5 that will maintain voltage V4 equal to Vref of 1.24V. As the opamp increases voltage V3, current I3 through resistor R3 will increase. As much as current I3 increases, current I1 must similarly decrease in order to maintain a voltage Vref of 1.24V. The voltage converter decreases Vswitch in order to achieve the required decrease in current I1. As Vswitch decreases, so too does the voltage applied to the motor 134.

As discussed above, the drive system 402 optionally includes a controller 404 that receives a dispensing parameter 420 from the motive power device 418 to facilitate a desired mode of operation. For example, the controller 404 might receive a motor back EMF to monitor the speed of a motor of the motive power device 418. In an embodiment that uses voltage and/or a change in voltage to effectuate a desired output drive condition to the dispensing apparatus 416 via the motive power device 418, the desired mode of power control may be a PWM technique. As discussed above, an embodiment employs a microprocessor equipped controller 404 disposed and configured in operable communication with the drive system 402 to facilitate the drive system 402 to operate in a first output drive condition in response to one of the aforementioned dispensing parameters having the first value, and to facilitate the drive system 402 to operate in a second output drive condition in response to the dispensing parameter having the second value.

Mechanical Control

In exemplary embodiments, as illustrated in FIG. 5, the dispenser 500 may utilize one or more mechanical schemes to implement the first output drive condition or the second output drive condition. In exemplary embodiments, the secondary motive power device 512 may include a transmission having a two-stage drive arrangement. The output of the transmission of the secondary motive power device 512 is connected to the dispensing apparatus 516 and provides an output characterized by the dispensing parameter 520 to the dispensing apparatus 516. The two-stage drive arrangement includes a high drive that is engaged during the first output drive condition and a low drive that is engaged during the second output drive condition. The low drive includes a drive ratio that results in a reduced output speed but an increased output torque, as compared to the high drive. As used herein, the term "drive" means gear, belt, pulley, lever, or any other mechanical drive system capable of providing input/output drive ratios, and any reference to a "gear" or "geared" system is intended to incorporate all such drive systems suitable for a purpose disclosed herein. In exemplary embodiments, a multi-stage geared arrangement may be employed in place of the two-stage geared arrangement, resulting in variable output torque drive.

In exemplary embodiments, the transmission may be a two-speed self-actuating transmission for achieving higher torque output from a relatively small motor. As discussed above, the transmission may be part of the secondary motive power device 512 and can be in high gear, or high drive, during normal operation against normal dispensing resistance when low torque is required, such as when dispensing a single thickness of sheet product from the body of the stub roll. If the dispensing parameter 520 increases above a threshold torque, such as if breaking the adhesive at the end of the stub roll 508 increases dispensing resistance 510 above a threshold torque, then the transmission can automatically shift to low gear, or low drive.

In exemplary embodiments, the transmission can include a planetary gear-set with a 1:1 gear ratio in high gear, and a 5:1 gear ratio in low gear. While certain gear ratios are depicted herein, it will be appreciated that this is for discussion purposes only, and that other gear ratios suitable for the purpose disclosed herein are also considered within the scope of the invention.

Figure 15:
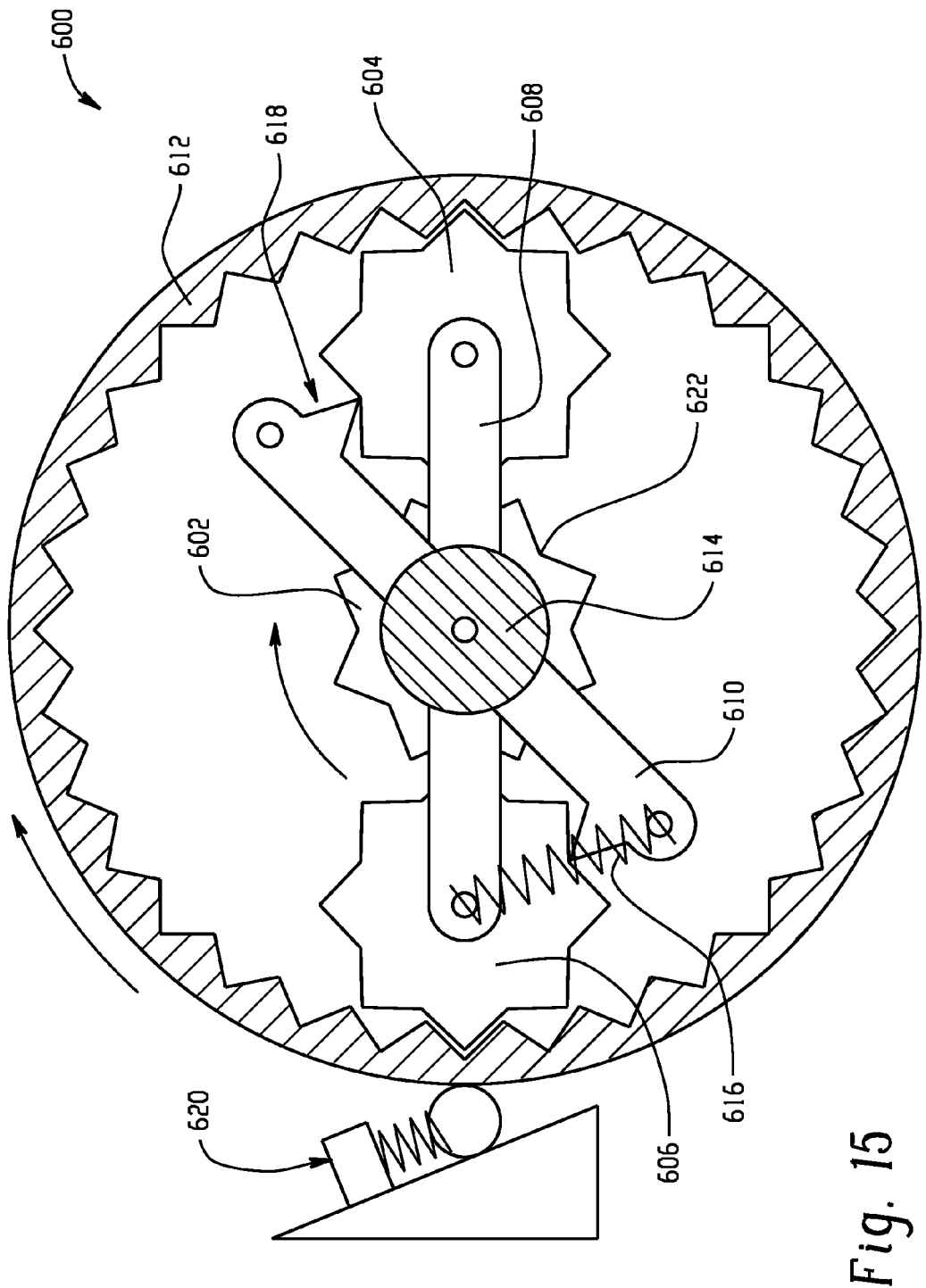
FIG. 15 depicts an example transmission in accordance with an embodiment.

Referring now to FIG. 15, an exemplary two-speed self actuating transmission 600 is shown. The transmission 600 includes a sun gear 602 that receives input from a motor (which is the primary motive power device in this embodiment), planet gears 604, 606 that are coupled to the sun gear 602 via a planet carriage 608 and a drive roller bar 610, and a ring gear 612. The drive roller bar 610 includes a drive roller shaft 614 that is coupled to the dispensing apparatus 516. The planet carriage 608 is coupled to the drive roller bar 610 via a tension spring 616 disposed at one end of the drive roller bar 610. The tension spring 616 acts to bias the locking mechanism 618 disposed at both ends of the drive roller bar 610 in engagement with the planet gears 604, 606.

During normal operation, that is when in high gear, the motor causes a clockwise rotation of the sun gear 602 and the sheet product being dispensed exerts minimal torque, feedback torque, on the drive roller shaft 614. As used herein, the term minimal torque refers to a drive condition where a first value of torque that is less than a threshold torque (indicative of low dispensing resistance 510). In exemplary embodiments, the minimal torque is not sufficient to overcome the tension spring 616, so the projection of the locking mechanism 618 engages with the teeth of the planet gears 604, 606 to prevent the planet gears 604, 606 from rotating relative to the planet carriage 608, which forces the entire transmission 600, including ring gear 612, to rotate with the sun gear 602 and motor.

During a high torque load condition on the drive roller shaft 614, such as when the adhesive at the end of the stub roll is being broken, for example, the tension spring 616 extends and releases the locking mechanism 618 from the planet gears 604, 606 allowing the planet gears 604, 606 to rotate independent of planet carriage 608. As a result, the torque from the motor and the torque from the drive roller combine to attempt rotation of the ring gear 612 counter-clockwise. However, a one-way mechanism 620, such as a ratchet, or a sprig clutch for example, engages with the ring gear 612 to prevent the ring gear 612 from rotating counter-clockwise. As a result, the only remaining degree of freedom is for the sun gear 602 to rotate the planet gears 604, 606 via the planet carriage 608, causing the planet carriage 608 to rotate clockwise with a slower speed and a higher torque than the motor. The tension spring 616, and an optional hard stop 622 between the drive roller bar 610 and the planet carriage 608, cause the planet carriage 608 to rotate the drive roller bar 610 and drive roller shaft 614 clockwise. This high torque load condition is herein referred to as a second value of torque greater than the threshold torque (indicative of elevated dispensing resistance 510). As herein discussed, the second torque is greater than the first torque and is sufficient to overcome the elevated dispensing resistance 510.

As the torque load on the drive roller shaft 614 decreases, such as upon breakage of the aforementioned adhesive, the tension spring 616 becomes sufficient to lock the locking mechanism 618 of the drive roller bar 610 with the planet gears 604, 606, and to lock the planet gears 604, 606 with the planet carriage 608, thereby forcing the entire transmission 600 to resume rotation with a 1:1 gear ratio.

In an alternative embodiment, the drive roller shaft 614 is optionally equipped with a torsion spring (not specifically shown, but appropriately and understandably coupled between the drive roller shaft 614 and the planet carriage 608) that absorbs and smoothes out the torque required to start rolling the towel at the beginning of a dispense operation. By smoothing out the start-up torque, it is contemplated that the transmission 600 will not temporarily shift into low gear at the beginning of each dispense cycle.

From the foregoing discussion of a two-speed transmission, it will be appreciated that a multi-stage geared arrangement may be employed in place of the two-stage geared arrangement, which is considered to be within the scope of the invention disclosed herein.

In a further exemplary embodiment, the secondary motive power device 512 may include a mechanical impulse force generator to generate an impulse force having a peak force greater than that of a steady state force. The mechanical impulse force generator can be used to generate an impulse force that is capable of overcoming an elevated dispensing resistance.

Figure 16:
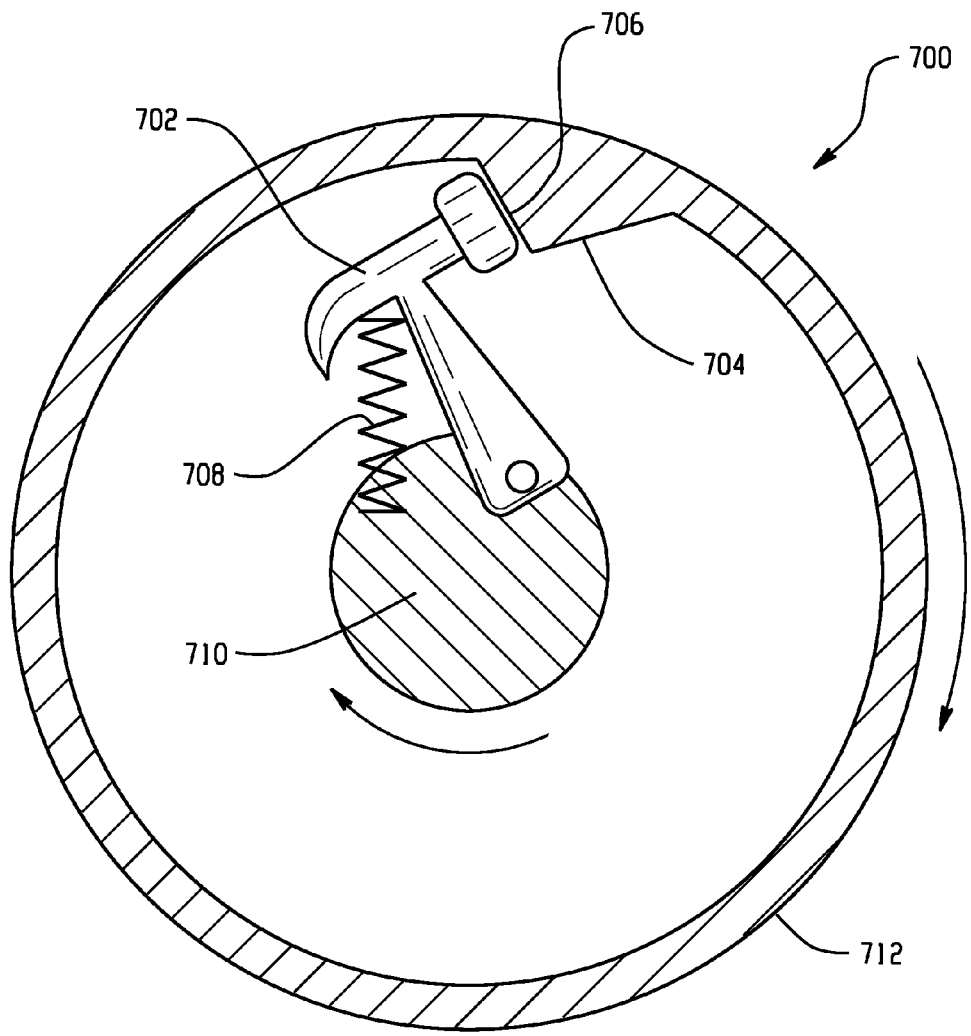
FIG. 16 depicts an example impulse device in accordance with an embodiment.

Referring now to FIG. 16, a mechanical impact device 700 in accordance with an exemplary embodiment is shown. The mechanical impact device 700 may be configured as part of secondary motive power device 512 and be coupled to a dispensing apparatus 516, via an outer housing 712. The mechanical impact device 700 may also be operably coupled to a motor (which is the primary motive power device in this embodiment) via an input shaft 710. In an embodiment, the impact device 700 includes a hammer portion 702 and an anvil portion 704 having a slip surface 706 to form a slip mechanism, alternatively referred to as a bypass mechanism, which may be collectively referred to by reference numerals 702, 704, 706 and 708 in combination. The hammer portion 702 is operably connected to the anvil portion 704 via the slip surface 706 and a spring 708, which is suitably disposed to bias the hammer portion 702 toward the anvil portion 704. In an embodiment, the spring 708 is a compression spring, but any spring suitable for the purpose disclosed herein is considered within the scope of the invention. Such a contemplated suitable spring is a torsion spring coupled between the hammer portion 702 and the input shaft 710. A first end of the hammer portion 702 is pivotally coupled in an off-axis manner, which is eccentrically, to the input shaft 710, while the second opposing end of the hammer portion 702 is slidably coupled to the anvil portion 704 via the slip surface 706, as discussed above. As the motor rotates clockwise, the input shaft 710 rotates clockwise, causing the pivotally connected first end of the hammer portion 702 to rotate clockwise about the pivot axis of the input shaft 710, which in turn causes the hammer portion 702 to push against the anvil portion 704.

Under normal operating conditions, also herein referred to as operating below a slip threshold, the spring 708 is of sufficient strength to maintain engagement of the hammer portion 702 with the anvil portion 704 as the input shaft 710 rotates clockwise, thereby resulting in the bypass mechanism operating in a non-bypass mode. That is, no slippage between the hammer portion 702 and the anvil portion 704 at the slip surface 706, resulting in the input shaft 710, the hammer portion 702, the anvil portion 704, and the outer housing 712 all rotating together. As such, the dispensing apparatus 516 is operably connected to receive non-impact output force from the impact device 700 via a non-bypass mode of operation in response to the drive system 502 dispensing against a low dispensing resistance 510.

During a high torque load condition on the input shaft 710, also herein referred to as operating above a slip threshold, the outer housing 712 is resisted in rotation relative to the input shaft 710 due to drag or increased dispensing resistance 510, causing the compression spring 708 to compress and the hammer portion 702 to slip by the slip surface 706 of the anvil portion 704, thereby resulting in the bypass mechanism operating in bypass mode. After the hammer portion 702 slips by the slip surface 706, the input shaft 710 and hammer portion 702 rotate while the outer housing 712 remains stationary, or at least rotates at a slower rate. As the input shaft 710 and the hammer portion 702 rotate, they gain or maintain momentum. After one revolution of the input shaft 710, the hammer portion 702 strikes the slip surface 706 of the anvil portion 704, which in turn transmits an impulse of energy or output force to the outer housing 712, which transmits an impulse of torque to the dispensing apparatus 516. As such, the dispensing apparatus 516 is operably connected to receive an impact output force greater than the force from the impact device 700 via a bypass mode of operation.

Figure 17A:
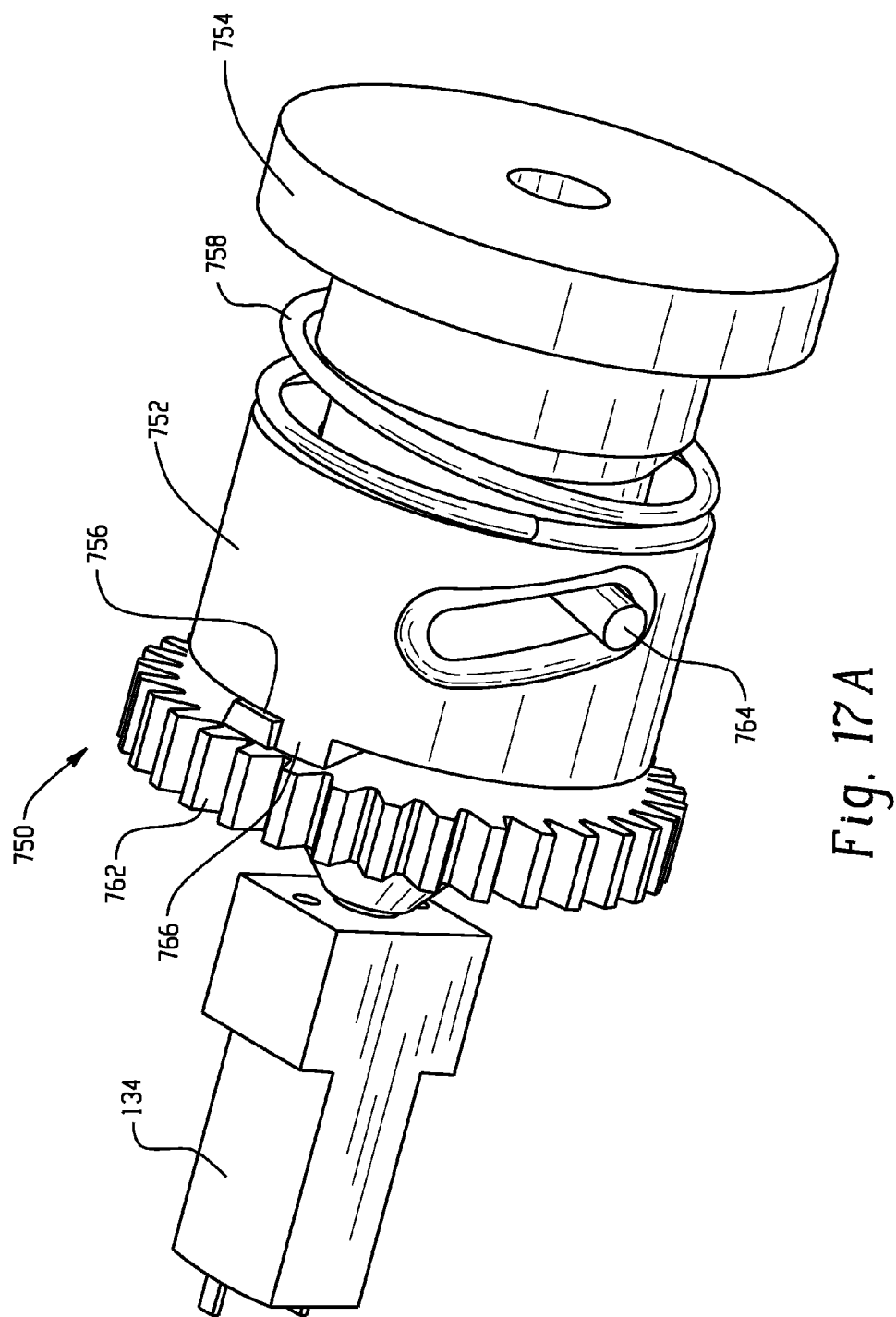
FIGS. 17A and 17B depicts another exemplary impulse device in accordance with an embodiment.
Figure 17B:
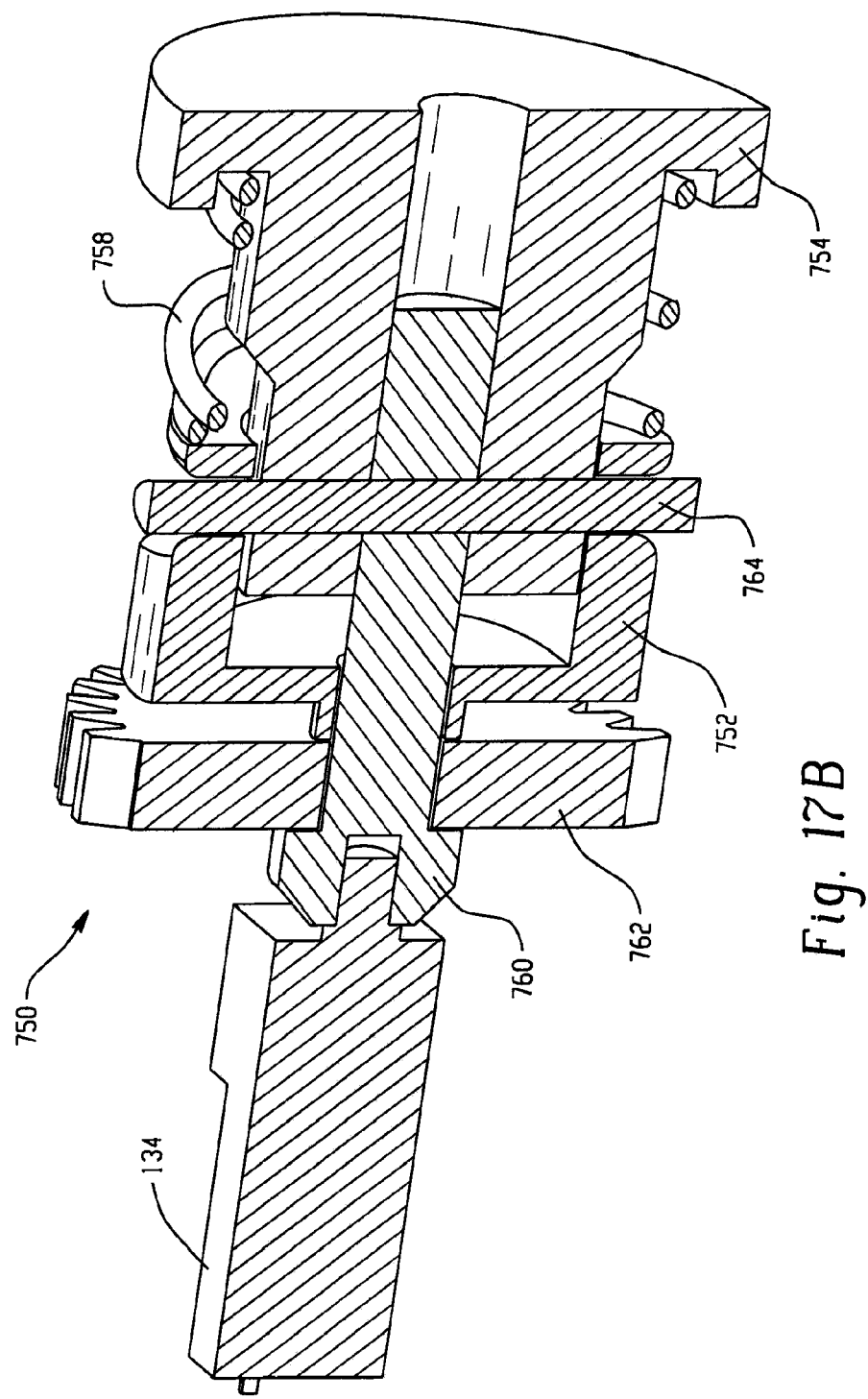

Referring now to FIGS. 17A and 17B, a mechanical impact device 750 in accordance with another exemplary embodiment is shown. The mechanical impact device 750 may be configured as part of the secondary motive power device 512 and be coupled to a dispensing apparatus 516, via a gear 762. The mechanical impact device 750 may also be operably coupled to a motor 134 via an input shaft 760. In an embodiment, the impact device 750 includes an impact sleeve 752 having an anvil portion 766 and the gear 762 includes an impact surface 756.

In exemplary embodiments, during normal operating conditions the motor 134 rotates the retainer sleeve 754, the spring 758, and the pin 764. The spring 758 pushes the anvil portion 766 of impact sleeve 752 against the impact surface 756 of the gear 762, which rotates the dispensing apparatus 516. If dispensing resistance against the gear 762 is low, the gear 762 is engaged with and rotates with the impact sleeve 752 and motor 134. If dispensing resistance against the gear 762 is high, the gear 762 and impact sleeve 752 will stop rotating, but the retainer sleeve 754 and pin 764 will continue to rotate with the motor 134, during which time the rotation of the pin 764 causes the impact sleeve 752 to raise against the spring 758 and slip over impact surface 756 of the gear 762. Once this happens, the impact sleeve 752 rotates with the motor 134 for a full revolution until the anvil portion 766 impacts the impact surface 756 of the gear 762, imparting a burst of energy intended to overcome peak dispensing resistance.

While specific structures of impact devices 700, 750 have been discussed, it will be appreciated that the scope of the invention is not limited to only the structures disclosed, but also encompasses any impulse mechanism disposed in the drive system 502, where such a mechanism may be embodied as impact wrenches used in automotive repair shops for example. A contemplated suitable impulse mechanism first accumulates rotational energy and then quickly releases that energy in the form of an impulse, which is contemplated to be effective at bumping the drive roller to overcome high torque loads on the drive roller.

In exemplary embodiments, the primary motive power device 518 may include a first motor and the secondary motive power device 512 may include a second motor that is configured to provide additional torque when combined with the first motor. The dispenser 500 can be configured to use torque from only the first motor during the first output drive condition, and to use torque from only the second motor or a combination of the first and second motors during the second output drive condition.

Figure 18:
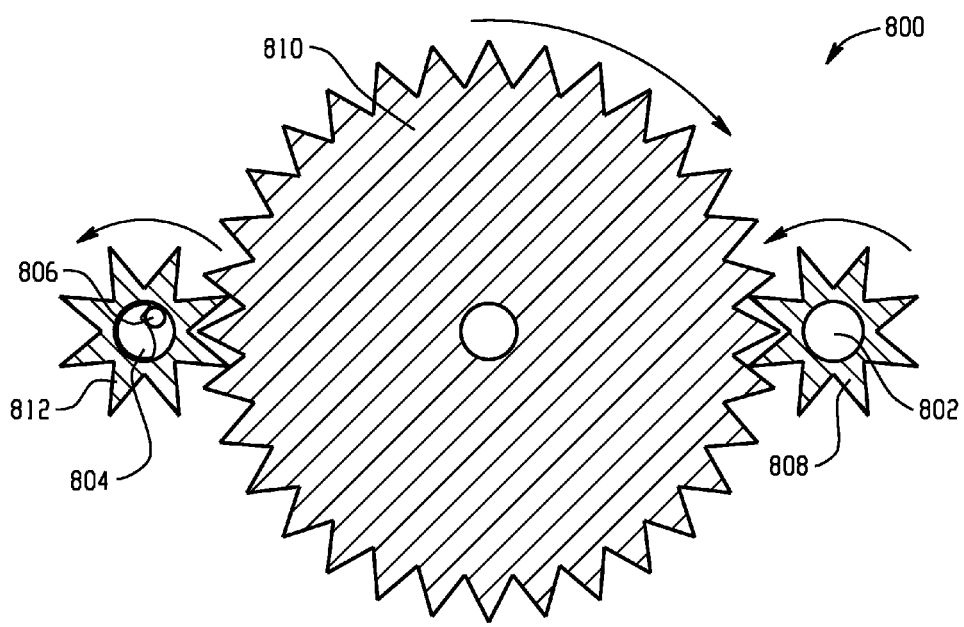
FIG. 18 depicts an example drive system having a primary motive power device and a secondary motive power device in accordance with an embodiment.

Referring now made to FIG. 18, an exemplary dual motor drive system 800 is shown. The dual motor system 800 includes a first motor 802 and a second motor 804. In one embodiment, the first motor 802 is connected to gear-1 808, which rotates a dispensing apparatus 516 attached to gear-3 810. Gear-3 810 is also connected to gear-2 812, which contains a one-way clutch 806. In an embodiment, the one-way clutch 806 is configured to determine whether a threshold torque or threshold speed has been crossed. Under a dispensing condition, the first motor 802 rotates gear-1 808 counter-clockwise, which rotates gear-3 810 clockwise, which rotates gear-2 812 counterclockwise. When gear-2 812 rotates faster than the second motor 804, which also rotates counterclockwise, the one-way clutch 806 freewheels and gear-2 812 is disengaged from the second motor 804. As an increase in dispensing resistance 510 causes torque against the first motor 802 to increase (or the speed of the gears to decrease), the torque or speed eventually will cross the threshold level, beyond which the second motor 804 rotates at the same speed as gear-2 812. When this happens, the one-way clutch 806 engages, allowing the second motor 804 to contribute torque to gear-2 812, gear-3 810, and the dispensing apparatus 516 attached to gear-3 810. In one embodiment, the second motor 804 is energized when the first motor 802 is energized. In another embodiment, the second motor 804 is de-energized when the first motor 802 is energized, and then the second motor 804 is energized when the torque or speed threshold is crossed. In yet another embodiment, the first motor 802 is de-energized when the second motor 804 is energized.

In view of the foregoing, it will be appreciated that the first motor 802 and the second motor 804 may have similar or different torque output capabilities, depending on whether the first motor 802 and the second motor 804 are energized at the same time or not. For example, if the first motor 802 is de-energized when the second motor 804 is energized, then the second motor 804 would need to have a greater torque output capability than the first motor 802. In another example, if the first motor 802 is energized when the second motor 804 is energized, then the second motor 804 could have equal, greater, or less torque output capability as compared to the first motor 802. If the first motor 802 and the second motor 804 are both energized, the second motor 804 could have equal or less torque output capability as compared to the first motor 802 since the effective output torque is cumulative.

In an embodiment where the first motor 802 and the second motor 804 are always energized together, gear-1 808 and the first motor 802 might rotate at 600 rpm against 1 in-lb torque resistance during a typical dispensing operation. This would cause gear-3 810 to rotate at 150 rpm against 4 in-lb torque resistance, and gear-2 812 to rotate at 600 rpm against 0 in-lb torque resistance. An elevated torque resistance from the dispensing apparatus 516 might increase enough to slow the first motor 802 to 6 rpm. At this point, the one-way clutch 806 in gear-2 812 would engage. As a result, the first motor 802 and gear-1 808 would contribute 5 in-lb of torque to gear-3 810, and the second motor 804 and gear-2 812 would be on the verge of contributing torque to gear-3 810. If the dispensing resistance 510 from the dispensing apparatus 616 increased further, the first motor 802 and the second motor 804 might slow down to 4 rpm. As a result, the first motor 802 and gear-1 808 would contribute 6 in-lb of torque to gear-3 810. Since the second motor 804 is still engaged with gear-2 812, gear-2 812 would contribute 10 in-lb of torque to gear-3 810. Therefore, the first motor 802 and the second motor 804 would apply a total of 16 in-lb of torque to gear-3 810, which would allow gear-3 810 to overcome a torque resistance of 64 in-lb from the dispensing apparatus 516. Once the dispensing resistance 510 begins to decrease, speed of the first motor 802 and gear-1 808 will increase to 6 rpm as above, at which point the one-way clutch 806 will disengage and the second motor 804 will not provide output drive torque to gear-3 810 via gear-2 812.

In view of the foregoing, it will be appreciated that an embodiment includes an arrangement where the primary motive power device 518 includes a first motor 802 and the secondary motive power device 512 includes a second motor 804 that are operably coupled with the dispensing apparatus 516. The dispensing apparatus 516 is operably connected to receive output from the first motor 802 in response to the drive system 502 being operated in a first output drive condition, and is operably connected to receive output from a combination of the first motor 802 and the second motor 804 in response to the drive system 502 being operated in the second output drive condition. In an embodiment, the dispensing apparatus 516 includes a drive roller and a pinch roller, where the drive roller is operably connected to receive output from the first motor 802 in response to the drive system 502 being operated in the first output drive condition, and is operably connected to receive output from a combination of the first motor 802 and the second motor 804 in response to the drive system 502 being operated in the second output drive condition.

In view of the embodiment mentioned above where the first motor 802 may be de-energized when the second motor 804 is energized, it will be appreciated that an embodiment also includes an arrangement where the second motor 804 is the only motor output for conditions where the torque or speed exceeds the threshold values. It will be appreciated that both mechanical and electrical control schemes can be utilized for selectively energizing and de-energizing the first and second motors under certain operating conditions.

Figure 19:
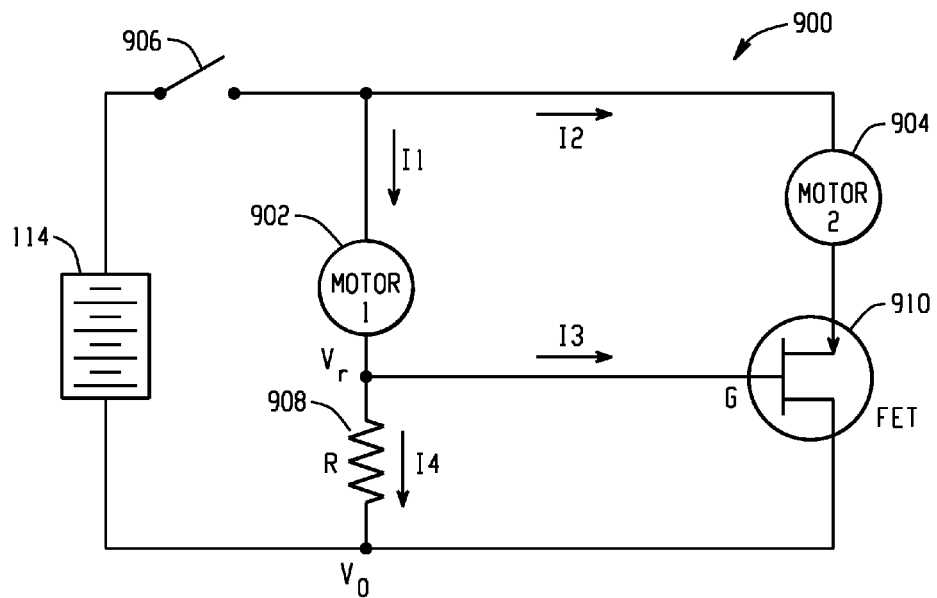
FIG. 19 depicts an electric circuit for controlling a drive system having a primary motive power device and a secondary motive power device in accordance with an embodiment.

Referring now to FIGS. 5 and 19, an analog circuit 900 is depicted for controlling an embodiment where a primary motive power device 518 includes a motor 902 and a secondary motive power device 512 includes a motor 904. The analog circuit 900 includes a shunt resistor 908 and a FET transistor 910 that respond to a current I1 through the first motor 902. When the current I1 through the first motor 902 is low, the shunt resistor voltage $V_r-V_0$ is lower than the gate voltage required to enable the FET transistor 910. As a result, the second motor 904 is inactive. When the current through the first motor 902 is high, $V_r-V_0$ exceeds the gate voltage required to enable the FET transistor 910, causing the current I3 to be greater than zero, thereby enabling the FET transistor 910 to collect current I2 and energize the second motor 904.

When controller 504 of dispenser 500 determines that it should be dispensing material (block 304 of FIG. 3), the controller 504 closes the dispenser motor switch 906. The current I1 through the first motor 902 correlates with the torque that the first motor 902 creates to overcome a dispensing resistance 510. For a low or normal dispensing resistance, I1 is below the current/torque threshold necessary to enable the FET transistor 910, and the drive system 502 provides a first output condition from the primary motive power device 518 to the dispensing apparatus 516. For a higher dispensing resistance, I1 exceeds the current/torque threshold necessary to cause I3 to exceed zero, thereby enabling the FET transistor 910 and the second motor 904 to energize and contribute output, at which time the drive system 502 provides a second output condition from both the primary motive power device 518 and the secondary motive power device 512 to the dispensing apparatus 516.

In an embodiment, the controller 158 includes a processor 162 coupled to a random access memory (RAM) device 164, a non-volatile memory (NVM) device 166, and a read-only memory (ROM) device 168. The main controller 158 may optionally be connected to one or more input/output (I/O) controllers or data interface devices (not shown). The NVM device 166 is any form of non-volatile memory such as an EPROM (Erasable Programmable Read Only Memory) chip, a flash memory chip, a disk drive, or the like. Stored in the NVM device 166 are various operational parameters for the application code stored in the ROM device 168. It should be recognized that the application code could be stored in the NVM device 166 rather than in the ROM device 168.

The main controller 158 includes operation control methods embodied in application code. These methods are embodied in computer instructions written to be executed by the processor 162, typically in the form of software. The software can be encoded in any language, including, but not limited to, machine language, assembly language, VHDL (Verilog Hardware Description Language), VHSIC HDL (Very High Speed IC Hardware Description Language), Fortran (formula translation), C, C++, Visual C++, Java, ALGOL (algorithmic language), BASIC (beginners all-purpose symbolic instruction code), visual BASIC, ActiveX, HTML (HyperText Markup Language), and any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

As discussed, an embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, such as random access memory (RAM), read only memory (ROM), erasable programmable read only memory (EPROM), electrically erasable programmable read only memory (EEPROM), or flash memory, for example, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to adjust the output drive of a drive system for a product dispenser from a first output drive condition to a second output drive condition in response to an elevated dispensing resistance in order to overcome the elevated dispensing resistance for continued dispensing of product.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A dispenser, comprising:
a product housing configured to receive a product to be dispensed;
a drive system comprising a motive power device and a controller, the drive system configured to receive energy from an electrical energy supply;
a dispensing apparatus disposed in operable communication with the drive system, the dispensing apparatus configured and disposed in operable communication with the product housing to dispense the product;
wherein during a condition when the product is being dispensed the dispensing apparatus is subject to a dispensing resistance and the drive system provides an output to the dispensing apparatus to overcome the dispensing resistance, said output being characterized by a dispensing parameter,
wherein the controller determines the dispensing resistance based on the dispensing parameter and responsively operates the motive power device, such that the controller operates the motive power device in a first output drive condition in response to the dispensing resistance being below a threshold value, and operates the motive power device in a second output drive condition in response to the dispensing resistance being above a threshold value.

2. The dispenser of claim 1, wherein the second output drive condition, relative to the first output drive condition, includes a greater output from the drive system.

3. The dispenser of claim 1, wherein during the first output drive condition the controller provides the motive power device a first input voltage and during the second output drive condition the controller provides the motive power device a second input voltage, wherein the second input voltage is greater than the first input voltage.

4. The dispenser of claim 1, wherein the first output drive condition has a uniform output and the second output drive condition has a non-uniform output.

5. The dispenser of claim 4, wherein the non-uniform output is an impulse torque.

6. The dispenser of claim 1, wherein the controller disposed in operable communication between the electrical energy supply and the motive power device is configured to receive the dispensing parameter, and in response to the dispensing parameter modify a voltage from the electrical energy supply and deliver the modified voltage to the motive power device.

7. The dispenser of claim 1, wherein the dispensing parameter is a dispensing torque required to dispense the product.

8. The dispenser of claim 7, wherein the motive power device comprises a motor, and wherein the dispensing torque is a function of a current through the motor.

9. The dispenser of claim 1, wherein the dispensing parameter is a dispensing speed at which the product is dispensed.

10. The dispenser of claim 9, wherein the motive power device comprises a motor, and wherein the speed is determined by measuring a back EMF of the motor.

11. A dispenser, comprising:
a product housing configured to receive a product to be dispensed;
a drive system comprising a primary motive power device and a secondary motive power device, the drive system configured to receive energy from an electrical energy supply;
a dispensing apparatus disposed in operable communication with the drive system, the dispensing apparatus configured and disposed in operable communication with the product housing to dispense the product;
wherein during a condition when the product is being dispensed the dispensing apparatus is subject to a dispensing resistance and the drive system provides an output to the dispensing apparatus to overcome the dispensing resistance, said output being characterized by a dispensing parameter,
wherein the secondary motive power device is operably responsive to the dispensing parameter, such that the secondary motive power device operates in a first output drive condition in response to the dispensing resistance being below a threshold value, and operates in a second output drive condition in response to the dispensing resistance being above a threshold value.

12. The dispenser of claim 11, wherein the second output drive condition, relative to the first output drive condition, includes a greater output from the drive system.

13. The dispenser of claim 11, wherein the first output drive condition has a uniform output and the second output drive condition has a non-uniform output.

14. The dispenser of claim 13, wherein the non-uniform output is an impulse torque.

15. The dispenser of claim 11, wherein the primary motive power device comprises a motor, the secondary motive power device comprises a transmission coupled to the motor and the dispensing apparatus comprises a drive roller operably connected to the transmission.

16. The dispenser of claim 15, wherein the transmission comprises a first drive ratio and a second drive ratio, the dispensing apparatus being operably connected to receive output from the first drive ratio in response to the secondary motive power device being operated in the first output drive condition, and being operably connected to receive output from the second drive ratio in response to the secondary motive power device being operated in the second output drive condition.

17. The dispenser of claim 11, wherein the primary motive power device comprises a first motor and the secondary motive power device comprises a second motor, the dispensing apparatus being operably connected to receive output from the first motor in response to the secondary motive power device being operated in the first output drive condition, and being operably connected to receive output from a combination of the first motor and the second motor in response to the secondary motive power device being operated in the second output drive condition.

18. The dispenser of claim 11, wherein the primary motive power device comprises a first motor and the secondary motive power device comprises a second motor, the dispensing apparatus being operably connected to receive output from the first motor in response to the secondary motive power device being operated in the first output drive condition, and being operably connected to receive output from the second motor in response to the secondary motive power device being operated in the second output drive condition.

19. The dispenser of claim 11, wherein the primary motive power device comprises a motor and the secondary motive power device comprises an impact device, the impact device operably connected between the motor and the dispensing apparatus.

20. The dispenser of claim 19, wherein the impact device comprises a hammer portion and an anvil portion, the hammer portion being operably connected to the anvil portion via a bypass mechanism, the bypass mechanism being operable in a non-bypass mode and in a bypass mode, the dispensing apparatus being operably connected to receive output from the impact device in the non-bypass mode in response to the secondary motive power device being operated in the first output drive condition, and being operably connected to receive output from the impact device in the bypass mode in response to the secondary motive power device being operated in the second output drive condition.

21. A dispenser, comprising:
a product housing configured to receive a product to be dispensed;
a drive system comprising a primary motive power device, a secondary motive power device and a controller, the drive system configured to receive energy from an electrical energy supply;
a dispensing apparatus disposed in operable communication with the drive system, the dispensing apparatus configured and disposed in operable communication with the product housing to dispense the product;
wherein during a condition when the product is being dispensed the dispensing apparatus is subject to a dispensing resistance and the drive system provides an output to the dispensing apparatus to overcome the dispensing resistance, said output being characterized by a dispensing parameter,
wherein the controller determines the dispensing resistance based on the dispensing parameter and responsively operates the secondary motive power device, such that the controller operates the secondary motive power device in a first output drive condition in response to the dispensing resistance being below a threshold value, and operates the secondary motive power device in a second output drive condition in response to the dispensing resistance being above a threshold value.

22. The dispenser of claim 21, wherein the second output drive condition, relative to the first output drive condition, includes a greater output from the drive system.

23. The dispenser of claim 21, wherein the first output drive condition has a uniform output and the second output drive condition has a non-uniform output.

24. The dispenser of claim 23, wherein the non-uniform output is an impulse torque.

25. The dispenser of claim 21, wherein the primary motive power device comprises a first motor and the secondary motive power device comprises a second motor, the dispensing apparatus being operably connected to receive output from the first motor in response to the secondary motive power device being operated in the first output drive condition, and being operably connected to receive output from a combination of the first motor and the second motor in response to the secondary motive power device being operated in the second output drive condition.

26. The dispenser of claim 21, wherein the primary motive power device comprises a first motor and the secondary motive power device comprises a second motor, the dispensing apparatus being operably connected to receive output from the first motor in response to the secondary motive power device being operated in the first output drive condition, and being operably connected to receive output from the second motor in response to the secondary motive power device being operated in the second output drive condition.

* * * * *